United States Patent
Ahn et al.

(10) Patent No.: US 8,774,139 B2
(45) Date of Patent: Jul. 8, 2014

(54) METHOD FOR TRANSMITTING UPLINK CONTROL INFORMATION AND USER DEVICE

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 13/583,010

(22) PCT Filed: Mar. 8, 2011

(86) PCT No.: PCT/KR2011/001586
§ 371 (c)(1),
(2), (4) Date: Sep. 6, 2012

(87) PCT Pub. No.: WO2011/111977
PCT Pub. Date: Sep. 15, 2011

(65) Prior Publication Data
US 2012/0327916 A1    Dec. 27, 2012

Related U.S. Application Data

(60) Provisional application No. 61/313,079, filed on Mar. 11, 2010.

(51) Int. Cl.
*H04J 3/00* (2006.01)
(52) U.S. Cl.
USPC ............ 370/336; 370/329; 370/310; 370/328
(58) Field of Classification Search
None
See application file for complete search history.

(56) References Cited

U.S. PATENT DOCUMENTS

2009/0046582 A1*  2/2009  Sarkar et al. ............... 370/230.1

OTHER PUBLICATIONS

Nokia et al., "UL ACK/NAK Feedback in LTE-A TDD", 3GPP TSG RAN WG1 Meeting #60, R1-101419, Feb. 22-26, 2010, p. 1-4.
Panasonic, "UL ACK/NACK transmission on PUCCH for carrier aggregation", 3Gpp TSG-RAN WG1 Meeting #59, R1-094503, Nov. 9-13, 2009, p. 1-2.
ZTE, "ACK/NACK Design for LTE-Advanced", 3GPP TSG-RAN WG1 Metting #60, R1-101398, Feb. 22-26, 2010, p. 1-7.
ZTE, "Method for UL ACK/NACK resource allocation in LTE-A",3GPP TSG-RAN WG1 Meeting #60, R1-101561, Feb. 22-26, 2010, p. 1-5.

* cited by examiner

*Primary Examiner* — Anez Ebrahim
(74) *Attorney, Agent, or Firm* — Birch, Stewart, Kolasch & Birch, LLP

(57) ABSTRACT

The present invention provides a method for transmitting uplink control information and a user device, which transmits ACK/NACK (ACKnowledgement/Negative ACK) information and uplink control information other than the ACK/NACK information using a first PUCCH resource for transmitting the ACK/NACK information and a second PUCCH resource for transmitting the uplink control information within an uplink sub-frame, respectively when the first PUCCH resource and the second PUCCH resource belong to the same PUCCH area in each slot of the uplink sub-frame, and to drop the transmission of the uplink control information other than the ACK/NACK information using the first PUCCH resource when the first PUCCH resource and the second PUCCH resource belong to different PUCCH areas within the uplink sub-frame.

4 Claims, 22 Drawing Sheets

Single Component Carrier (e.g., LTE System)

METHOD FOR TRANSMITTING UPLINK CONTROL INFORMATION AND USER DEVICE

This application is the National Phase of PCT/KR2011/001586 filed on Mar. 8, 2011, which claims priority under 35 U.S.C. 119(e) to U.S. Provisional Application No. 61/313,079 filed on Mar. 11, 2010, all of which are hereby expressly incorporated by reference into the present application.

FIELD OF THE INVENTION

The present invention relates to a wireless communication system. Most particularly, the present invention relates to a method and apparatus for transmitting uplink control information.

BACKGROUND ART

Wireless communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a CDMA (code division multiple access) system, a FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on.

DETAILED DESCRIPTION OF THE INVENTION

Technical Objects

An object of the present invention is to provide a method and apparatus of a user equipment for transmitting multiple uplink control information in a wireless communication system. More specifically, the present invention provides method and apparatus enabling uplink control information to be efficiently transmitted over multiple PUCCH (Physical Uplink Control CHannel) within one subframe.

It is to be understood that objects to be achieved by the present invention are not limited to the aforementioned objects and other objects which are not mentioned will be apparent to those of ordinary skill in the art to which the present invention pertains from the following description.

Technical Solutions

According to an aspect of the present invention, a method of transmitting uplink control information in a wireless communication system is provided herein. The method for transmitting uplink control information comprises: receiving data from a base station; and deciding a first PUCCH (Physical Uplink Control CHannel) resource for transmitting ACK/NACK (ACKnowlegement/Negative ACK) information for the data and a second PUCCH resource for transmitting uplink control information other than the ACK/NACK information; when the first PUCCH resource and the second PUCCH resource belong to the same PUCCH region in each slot of an uplink subframe, transmitting the ACK/NACK information and the other uplink control information by using the first PUCCH resource and the second PUCCH resource in the uplink subframe, respectively, and, when the first PUCCH resource and the second PUCCH resource belong to different PUCCH regions in the uplink subframe, dropping the transmission of the other uplink control information and transmitting the ACK/NACK information by using the first PUCCH resource.

According to another aspect of the present invention, a user equipment transmitting uplink control information in a wireless communication system is provided herein. The user equipment comprises: a receiver; and a transmitter; a processor operatively connected to the receiver and the transmitter, and configured to control the receiver and the transmitter, wherein the processor controls the receiver so as to receive data from a base station; and is configured to decide a first PUCCH (Physical Uplink Control CHannel) resource for transmitting ACK/NACK (ACKnowlegement/Negative ACK) information for the data and a second PUCCH resource for transmitting uplink control information other than the ACK/NACK information; and controls the transmitter so as to transmit the ACK/NACK information and the other uplink control information by using the first PUCCH resource and the second PUCCH resource in a uplink subframe, respectively, when the first PUCCH resource and the second PUCCH resource belong to the same PUCCH region in each slot of the uplink subframe, and to drop the transmission of the other uplink control information and to transmit the ACK/NACK information by using the first PUCCH resource, when the first PUCCH resource and the second PUCCH resource belong to different PUCCH regions in the uplink subframe.

According to both aspects of the present invention, the user equipment may receive, from the base station, information indicating a PUCCH region allocated to the user equipment for transmission of the ACK/NACK information, and may decide the first PUCCH resource, from among PUCCH resources included in the allocated PUCCH region, based upon a first CCE (Control Channel Element) index of a PDCCH (Physical Uplink Control CHannel) carrying control information for the data.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Effects of the Invention

According to the exemplary embodiments of the present invention, the present invention is advantageous in that multiple uplink control signals may be efficiently transmitted in one subframe.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE PRESENT INVENTION

Figure 1:
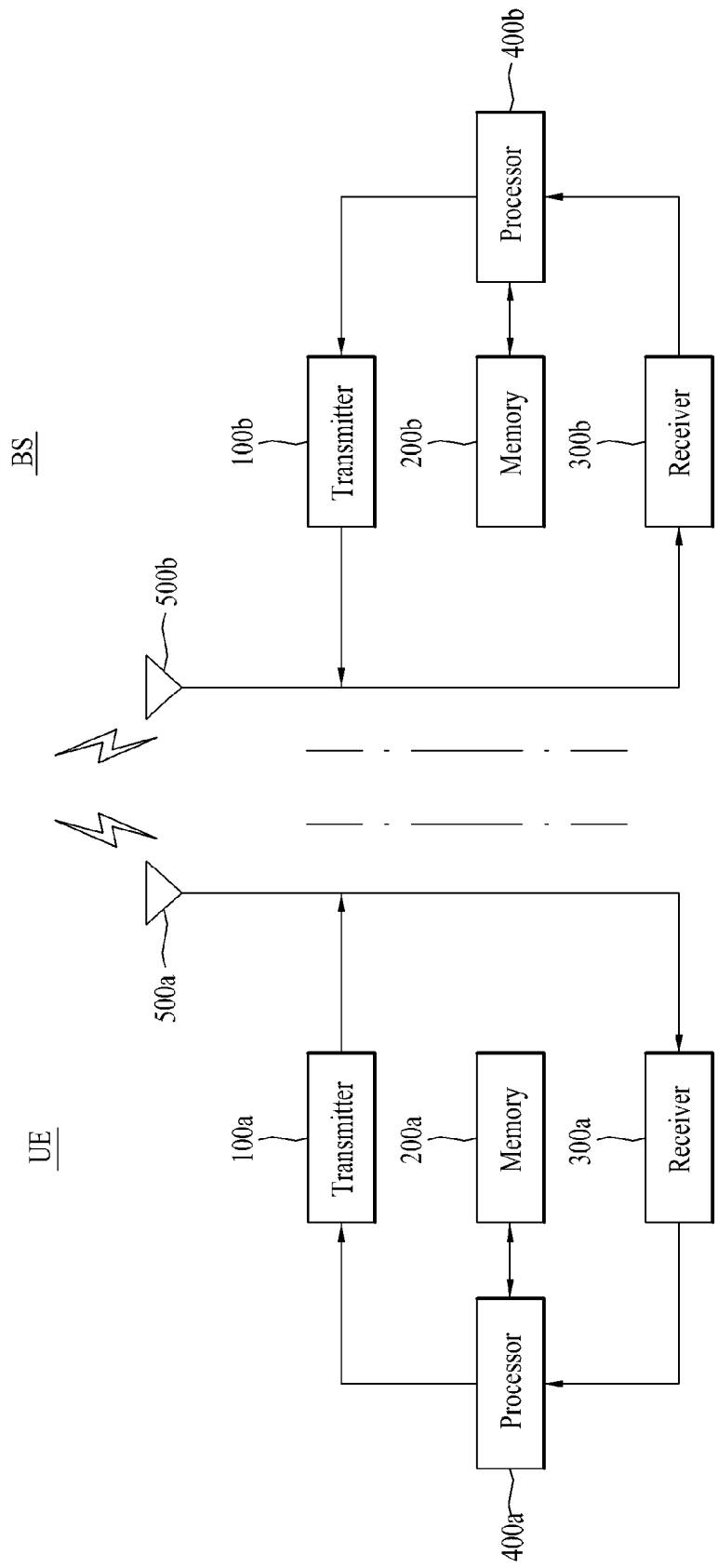
FIG. 1 is a block diagram of a user equipment (UE) and a base station (BS) for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatuses and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802.20, Evolved-UTRA (E-UTRA) etc. UTRA is a part of Universal Mobile Telecommunication System (UMTS). 3rd Generation Partnership Project (3GPP) Long Term Evolution (LTE) is a part of Evolved-UMTS (E-UMTS) using E-UTRA. 3GPP LTE employs OFDMA for downlink and employs SC-FDMA for uplink. LTE-Advanced (LTE-A) is an evolution of 3GPP LTE. For clarity, this application focuses on the 3GPP LTE/LTE-A. However, technical features of the present invention are not limited thereto. For example, although the following description will be made based on a mobile communication system corresponding to an 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a Base Station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a BS means a fixed station that performs communication with a UE and/or another BS, and exchanges various kinds of data and control information with the UE and another BS. The BS may be referred to as another terminology such as an evolved-Node B (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, a rank or transmission rank is the number of layers multiplexed/allocated to an OFDM symbol or data RE.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of resource elements (REs) carrying Downlink Control Information (DCI), a set of REs carrying Control Format Indicator (CFI), a set of REs carrying downlink ACK/NACK (ACKnowledgement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively. In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

In the present invention, the term "cell" refers to a geographical region to which a BS or an antenna group provides a communication service. Thus, when it is said that an entity communicates with a specific cell, it means that the entity communicates with an antenna group that provides a communication service to the specific cell. The term "downlink/uplink signal of a specific cell" refers to a downlink/uplink signal with respect to an antenna group that provides a communication service to the specific cell. The term "channel state/quality of a specific cell" refers to a channel state/quality of a communication link or a channel established between a UE and an antenna group that provides a communication service to the specific cell.

FIG. 1 is a block diagram of a user equipment (UE) and a base station (BS) for implementing the present invention.

The UE serves as a transmitting apparatus on the uplink and as a receiving apparatus on the downlink. In contrast, the BS may serve as a receiving apparatus on the uplink and as a transmitting apparatus on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by the processors 400a and 400b or schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted and received signals.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
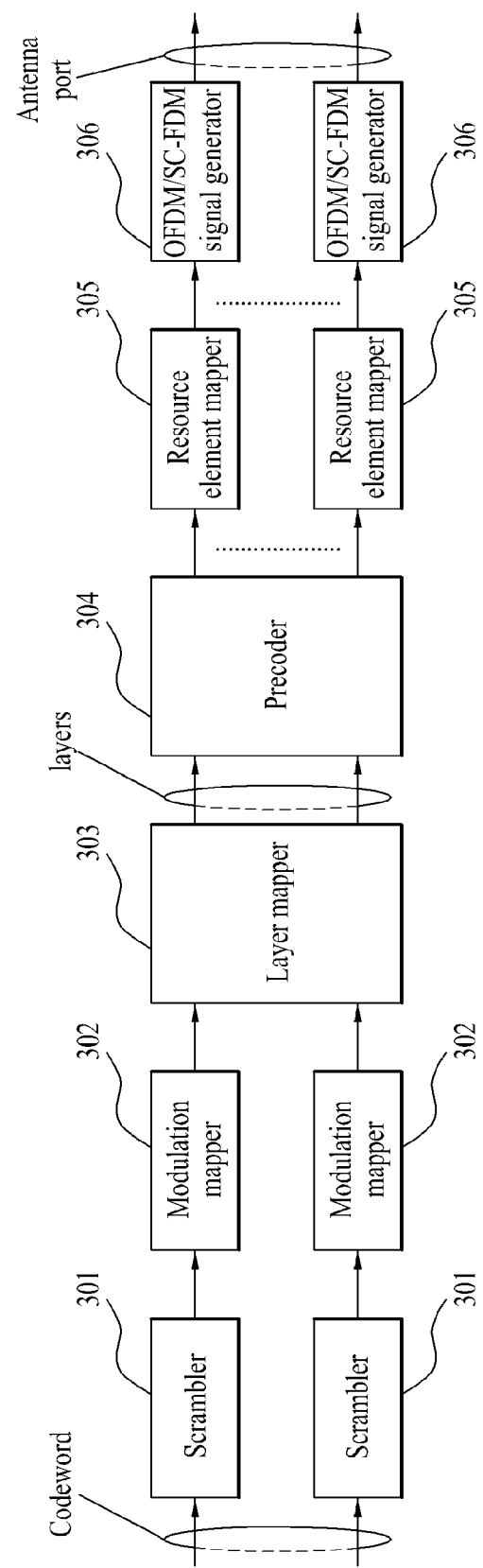
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing (OFDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM/SC-FDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is downconverted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers 300a and 300b receive SC-FDM signals, each of the receivers 300a and 300b further includes an IFFT module. The IFFT module IFFT-processes the antenna-specific symbols recovered by the RE demapper and outputs the IFFT symbol to the multiplexer.

While it has been described in FIGS. 1 and 2 that each of the transmitters 100a and 100b includes the scramblers 301, the modulation mappers 302, the layer mapper 303, the precoder 304, the RE mappers 305, and the OFDM/SC-FDM signal generators 306, it may be further contemplated that the scramblers 301, the modulation mappers 302, the layer mapper 303, the precoder 304, the RE mappers 305, and the OFDM/SC-FDM signal generators 306 are incorporated into each of the processors 400a and 400b of the transmitters 100a and 100b. Likewise, while it has been described in FIGS. 1 and 2 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC-FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC-FDM signal generators 306 are included in the processors 400a and 400b or the signal recoverer, the multiplexer, and the channel demodulator are included in the processors 400a and 400b, embodiments of the present invention are applicable in the same manner.

Figure 3:
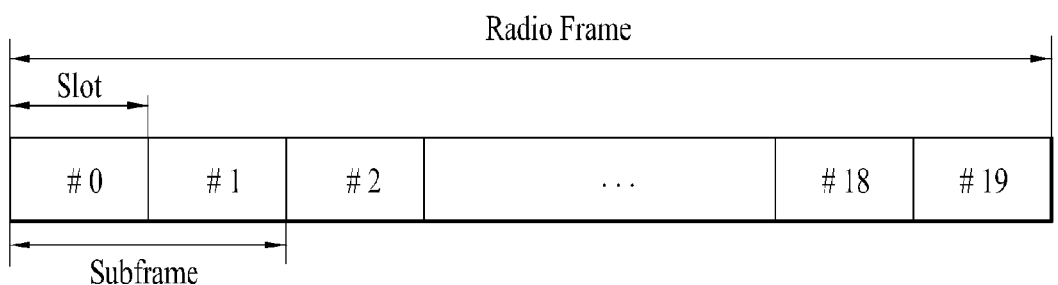
FIG. 3 illustrates an exemplary structure of a radio frame in a wireless communication system.

FIG. 3 illustrates an exemplary structure of a radio frame in a wireless communication system. Specifically, the radio frame is a 3GPP LTE/LTE-A radio frame. The radio frame structure is applicable to a Frequency Division Duplex (FDD) mode, a half FDD (H-FDD) mode, and a Time Division Duplex (TDD) mode.

Referring to FIG. 3, a 3GPP LTE/LTE-A radio frame is 10 ms (307,200 $T_s$) in duration. The radio subframe is divided into 10 equally-sized subframes, each subframe being 1 ms long. $T_s$ represents a sampling time and is given as $T_s=1/(2048\times15$ KHz$)$. Each subframe is further divided into two slots, each of 0.5 ms in duration. 20 slots are sequentially numbered from 0 to 19. A time interval in which one subframe is transmitted is defined as a Transmission Time Interval (TTI).

Figure 4:
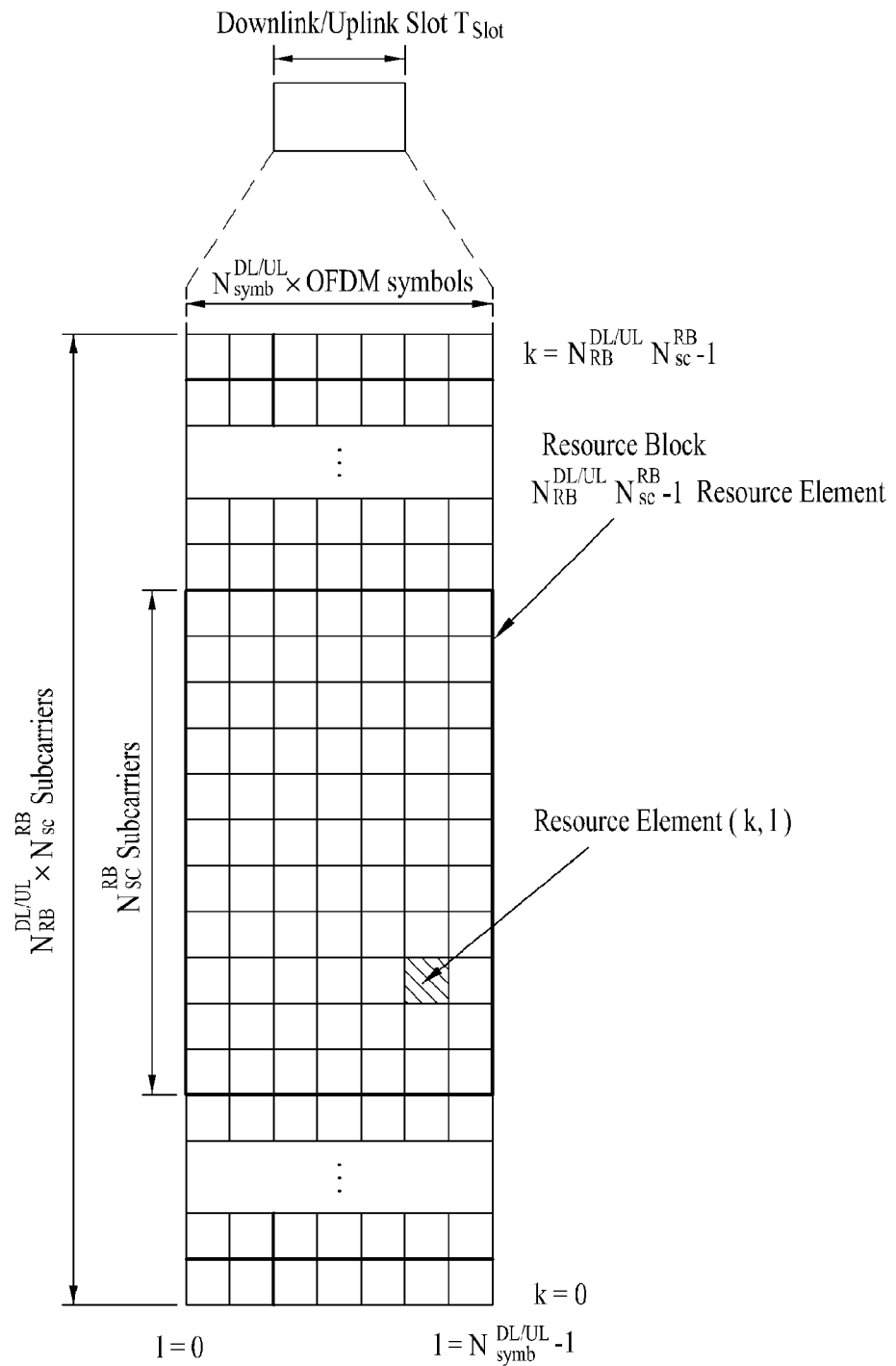
FIG. 4 illustrates an exemplary structure of a DownLink/UpLink (DL/UL) slot in the wireless communication system.

FIG. 4 illustrates an exemplary structure of a DownLink/UpLink (DL/UL) slot in the wireless communication system. Specifically, FIG. 4 illustrates the structure of a resource grid in the 3GPP LTE/LTE-A system. There is one resource grid per antenna port.

Referring to FIG. 4, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 4 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 4, a signal transmitted in each slot may be described by a resource grid including $N^{DL/UL}_{RB} N^{RB}_{sc}$ subcarriers and $N^{DL/UL}_{symb}$ OFDM or SC-FDM symbols. $N^{DL}_{RB}$ represents the number of RBs in a DL slot and $N^{DL}_{RB}$ represents the number of RBs in a UL slot. $N^{DL}_{RB}$ is dependent upon a DL transmission bandwidth, and $N^{UL}_{RB}$ is dependent upon a UL transmission bandwidth. Each OFDM symbol includes $N^{DL/UL}_{RB} N^{RB}_{sc}$ subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency ($f_0$) in an OFDM signal generation process. The carrier frequency may also be called a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/DL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb} \times N^{RB}_{sc}$ REs.

Each RE in the resource grid per each antenna port may be uniquely identified by an index pair (k, l) in a slot. k is a frequency-domain index ranging from 0 to $N^{DL/UL}_{RB} \times N^{RB}_{sc} - 1$ and 1 is a time-domain index ranging from 0 to $N^{DL/UL}_{symb} - 1$.

Figure 5:
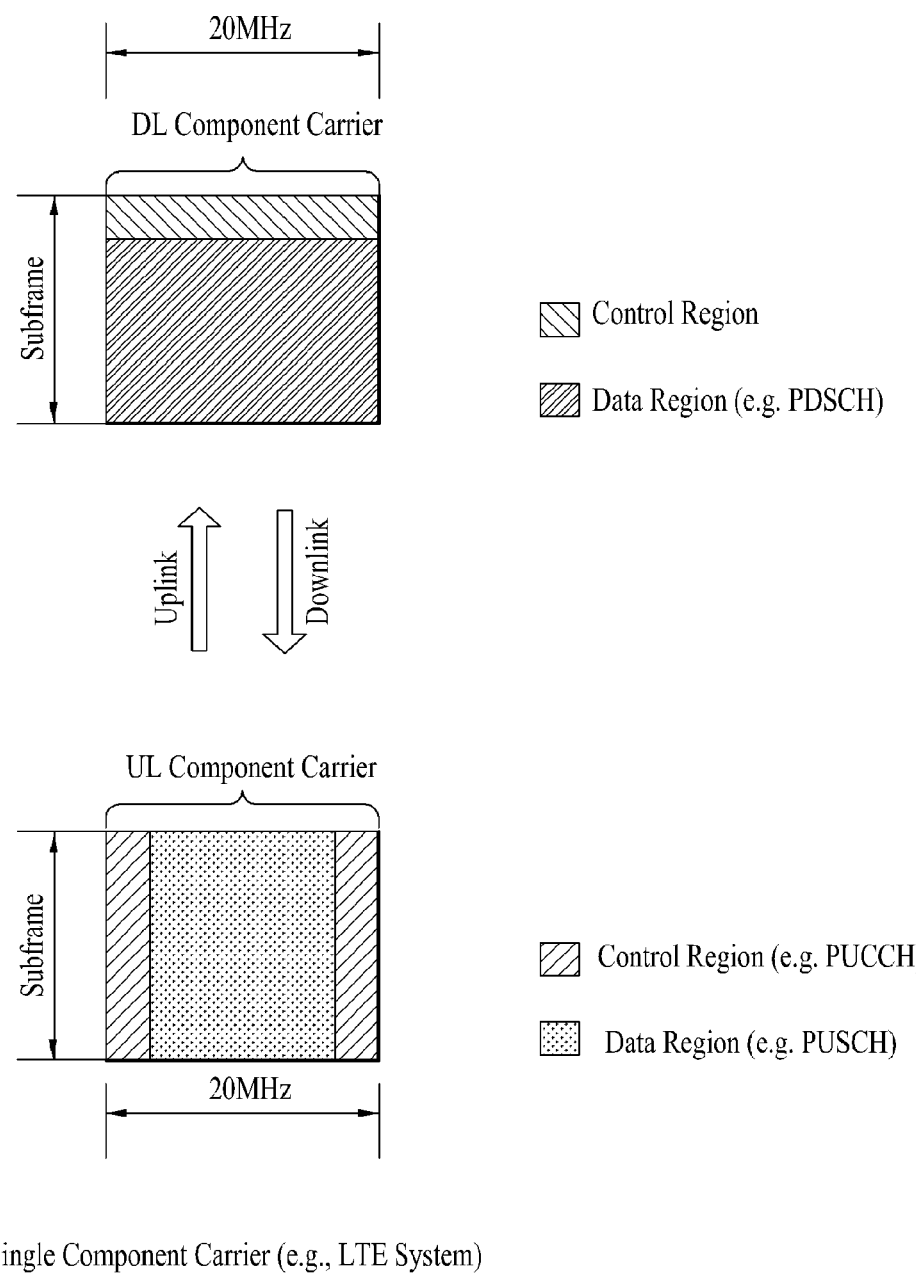
FIG. 5 shows exemplary communication under a single carrier situation.

FIG. 5 shows exemplary communication under a single carrier situation. The communication example shown in FIG. 5 may correspond to exemplary communication for the LTE system.

Referring to FIG. 5, a general FDD-type wireless communication system performs data transmission/reception through one DL band and one UL band corresponding to this DL band. The BS and the UE transmit/receive data and/or control information scheduled in units of a subframe. Data is transmitted/received through a data region configured in a UL/DL subframe, and control information is transmitted/received through a control region configured in a UL/DL subframe. For these operations, the UL/DL subframe may carry signals through various physical channels. Although FIG. 5 has disclosed only the FDD scheme for convenience of description, it should be noted that the scope or spirit of the present invention is not limited thereto, and can also be applied to the TDD scheme by dividing the radio frame of FIG. 5 according to an uplink (UL) and a downlink (DL) in a time domain.

Figure 6:
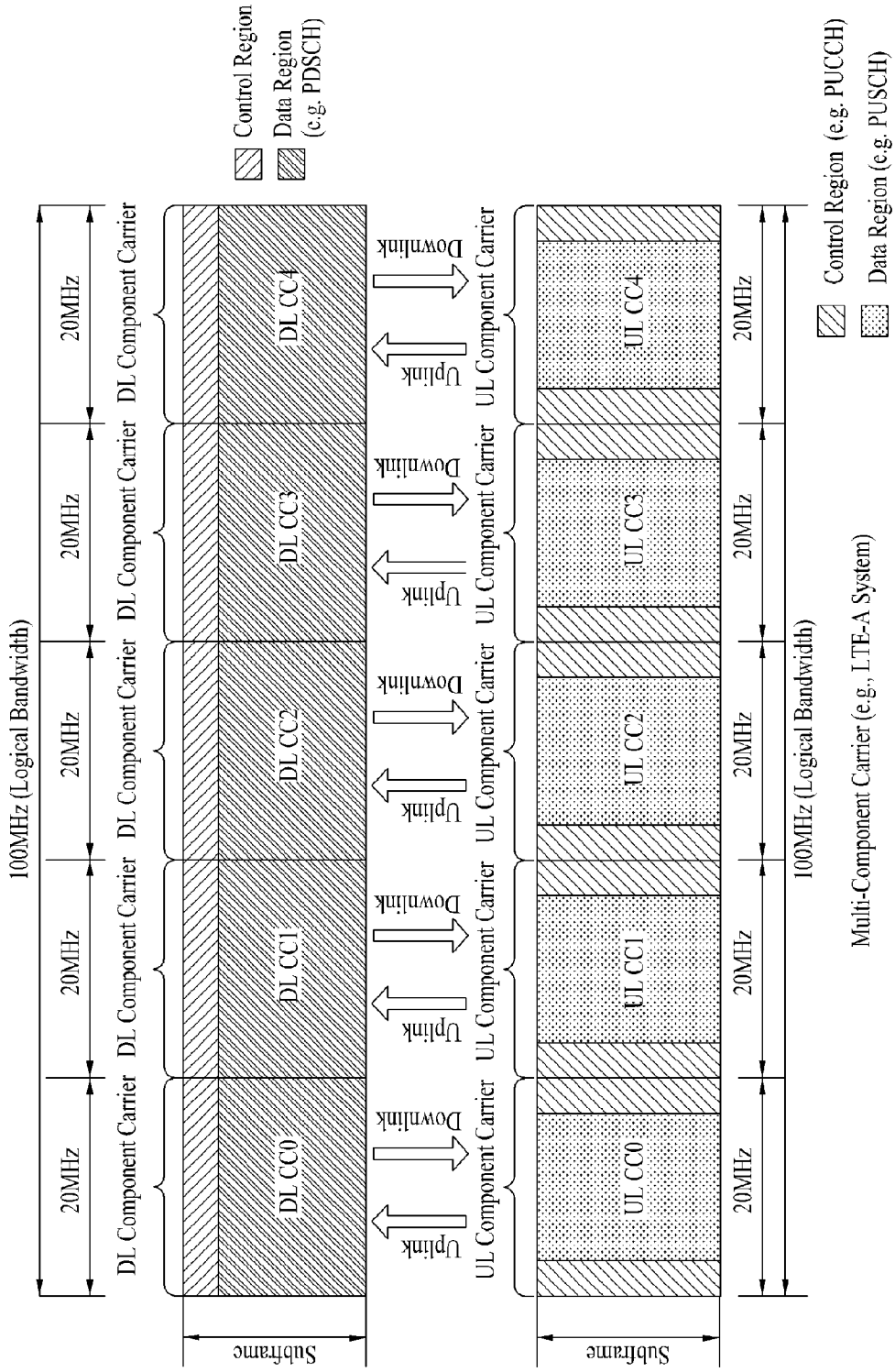
FIG. 6 shows exemplary communication under a multicarrier situation.

FIG. 6 shows exemplary communication under a multicarrier situation. The LTE-A system uses carrier aggregation or bandwidth aggregation technology that uses a larger bandwidth by aggregating several UL/DL frequency blocks. Each frequency block is transmitted by using a Component Carrier (CC). In the description of the present invention, depending upon the context, a Component Carrier may signify a frequency block designated for carrier aggregation or a central carrier of a frequency block (or may also be referred to as a central frequency, carrier frequency), and such terms may be used in combination. When only one component carrier is used for the communication, such communication may correspond to a communication performed under a single carrier situation, which is shown in FIG. 5.

For example, as can be seen from FIG. 6, five 20 MHz CCs are aggregated in each of UL and DL such that a 100 MHz bandwidth can be supported. Individual CCs may be contiguous or non-contiguous to each other in a frequency domain. FIG. 6 shows the example in which a UL CC bandwidth is symmetrically identical to a DL CC bandwidth. However, a bandwidth of each CC may be independently determined. For example, the UL CC bandwidth may be comprised of "5 MHz (UL CC0)+20 MHz (UL CC1)+20 MHz (UL CC2)+20 MHz (UL CC3)+5 MHz (UL CC4)". In addition, asymmetrical carrier aggregation in which the number of UL CCs is different from the number of DL CCs may also be achieved. The asymmetrical carrier aggregation may be generated by the limitation of an available frequency band or may be achieved by network configuration. For example, although the BS manages X CCs, a frequency band capable of being received in a specific UE may be limited to Y DL CCs (where Y<X). Accordingly, the UE may monitor the DL signal/data being transmitted on the Y number of CCs. Meanwhile, the base station may DL CC cell-specifically or UE-specifically, configure Z number of DL CCs (wherein, Z≤y≤X), which are to be primarily monitored/received by the UE, as the primary DL CC.

Figure 7:
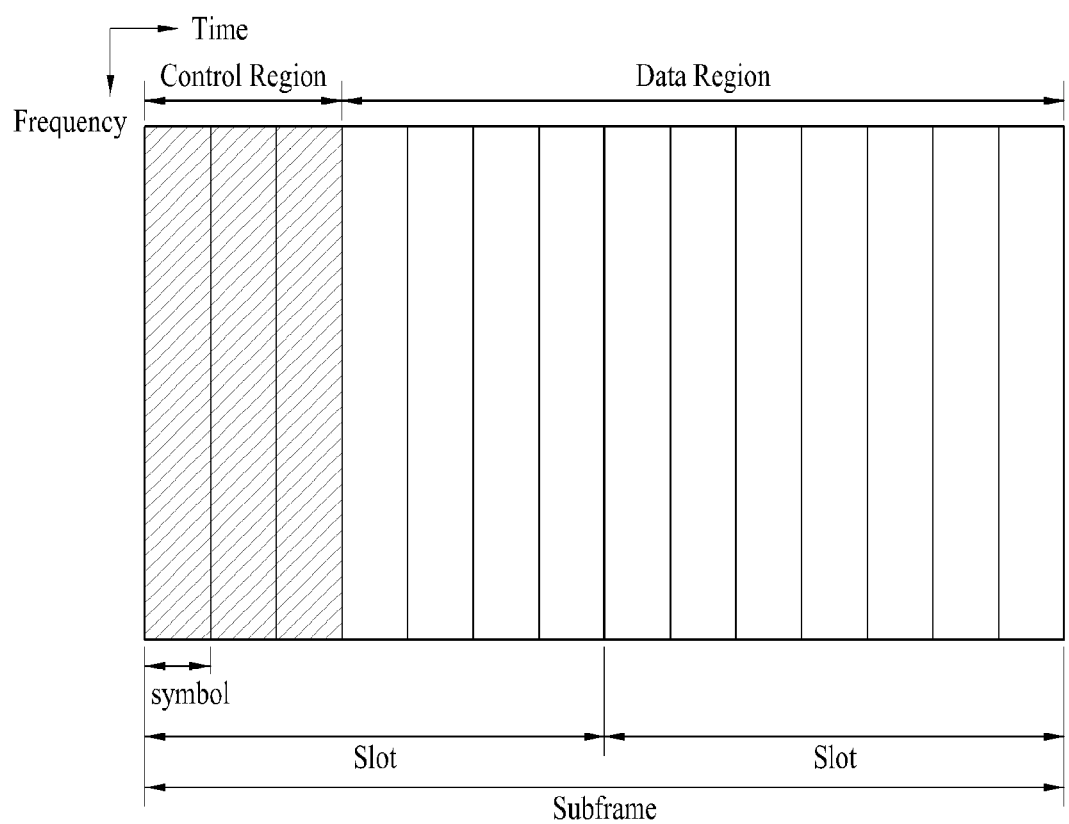
FIG. 7 illustrates an exemplary structure of a downlink (DL) subframe in the wireless communication system.

FIG. 7 illustrates an exemplary structure of a downlink (DL) subframe in the wireless communication system.

Referring to FIG. 7, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH (Physical Control Format Indicator CHannel). A BS may transmit control information to a UE or UEs in the control region. To transmit control information, a PDCCH (Physical Downlink Control CHannel), a PCFICH, a PHICH (Physical Hybrid automatic retransmit request Indicator CHannel), etc. may be allocated to the control region.

The BS may transmit information related to resource allocation of a PCH (Paging channel) and DL-SCH (Downlink-shared channel), an uplink scheduling grant, HARQ information, Downlink Assignment Index (DAD, Transmitter Power Control (TPC) command, etc. to each UE or each UE group on a PDCCH.

The BS may transmit data to a UE or UE group in the data region. Data transmitted in the data region is referred to as user data. A PDSCH (Physical Downlink Shared CHannel) may be allocated to the data region to convey data. PCH (Paging channel) and DL-SCH (Downlink-shared channel) may be transmitted on a PDSCH. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

Multiple PDCCHs may be transmitted in a control region. The UE monitors the multiple PDCCHs so as to detect its own PDCCH. The DCI carried by one PDCCH has different sizes and usages according to a PUCCH format. If necessary, the DCI size may also be changed according to a coding rate.

The DCI format may be independently applied to each UE. PDCCHs of multiple UEs may be multiplexed in one subframe. PDCCH of each UE may be independently channel-coded such that a CRC (Cyclic Redundancy Check) may be added to the PDCCH. The CRC is masked as a unique ID for each UE in such a manner that each UE can receive its own PDCCH. However, the UE does not know where its own PDCCH is transmitted, such that the UE performs blind detection (also called blind decoding) of all PDCCHs of the corresponding DCI format for each subframe until one PDCCH having a UE ID is received or detected.

Figure 8:
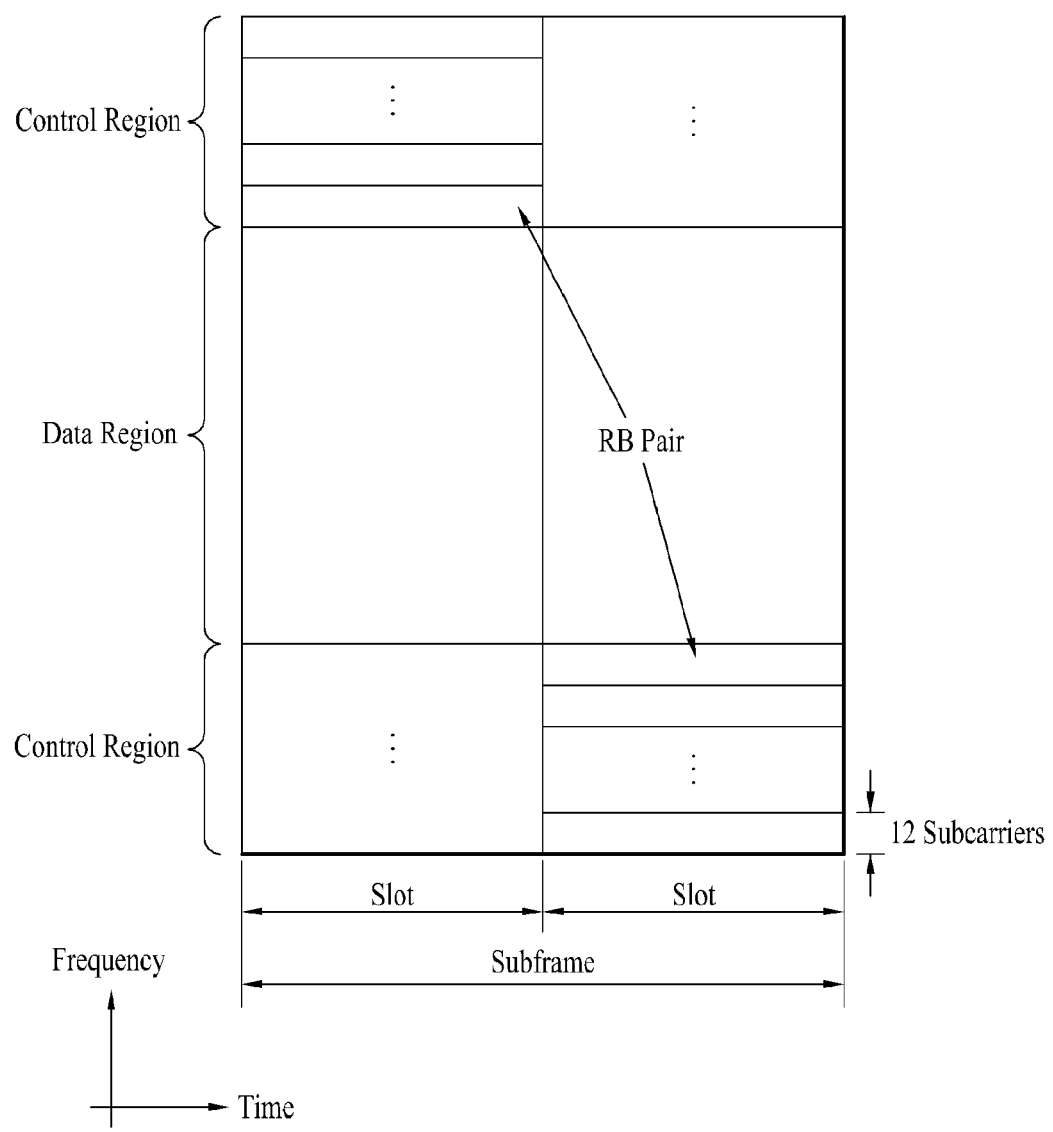
FIG. 8 illustrates an exemplary structure of a uplink (UL) subframe in the wireless communication system.

FIG. 8 illustrates an exemplary structure of a uplink (UL) subframe in the wireless communication system.

Referring to FIG. 8, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. In case that a UE adopts the SC-FDMA scheme for UL transmission, PUCCH and PUSCH cannot be transmitted simultaneously in order to maintain single carrier characteristics.

The UCI carried by one PUCCH has different sizes and usages according to the PUCCH format, and the UCI size may be changed according to the coding rate. For example, the PUCCH format may be defined as follows.

TABLE 1

| PUCCH format | Modulation scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint coding ACK/NACK (extended CP) |
| 2a | QPSK + BPSK | 21 | CQI + ACK/NACK | Normal CP only |
| 2b | QPSK + QPSK | 22 | CQI + ACK/NACK | Normal CP only |

In a UL subframe, subcarriers distant from a carrier frequency $f_0$ subcarrier may be used as a control region. In other words, subcarriers located at both ends of a UL transmission bandwidth are assigned to UL control information transmission. A PUCCH for a UE is allocated to an RB pair in a subframe. The RBs of the RB pair occupy different subcarriers in two slots. This is called frequency hopping of an RB pair allocated to a PUCCH over a slot boundary. However, if the frequency hopping is not used, an RB pair occupies the same subcarriers. Irrespective of the frequency hopping, PUCCHs for one UE are assigned to an RB pair contained in one subframe. Therefore, each PUCCH is transmitted through one RB in each slot contained in one UL subframe that the same PUCCH is transmitted twice in one UL subframe. Hereinafter, a group of subcarriers (or RBs), which are located in one side based on a carrier frequency $f_0$ within each slot of a subframe, and being used by the UE or UE group for PUCCH transmission, will hereinafter be referred to as a first PUCCH region (PUCCH region 1). And, a group of subcarriers (or RBs), which are respectively located in the opposite side based on the carrier frequency $f_0$ within a subframe, and being used by the UE or UE group for PUCCH transmission, will hereinafter be referred to as a second PUCCH region (PUCCH region 2). When frequency-hopping is being applied, each PUCCH region occupies subcarriers (or RBs) located at one side based upon carrier frequency $f_0$ in one slot of a subframe, and each PUCCH region also occupies subcarriers (or RBs) located in opposite sides based upon the carrier frequency $f_0$ in another slot of the subframe. On the other hand, when frequency-hopping is not applied, each PUCCH region occupies subcarriers (or RBs) all being located at the same side in two slots of the subframe.

Uplink Control Information (UCI) such as ACK/NACK (ACKnowlegement/negative ACK), Channel Quality Indicator (CQI), Precoding Matrix Indicator (PMI), Rank Information (RI), Scheduling Request (SR), etc. may be transmitted in a control region of the UL subframe.

Hereinafter, for convenience of description, a PUCCH carrying ACK/NACK from among PUCCHs is called 'ACK/NACK PUCCH', a PUCCH carrying CQI/PMI/RI is called a Channel Information PUCCH, and a PUCCH carrying the SR is called an SR PUCCH.

The UE is allocated, by the BS, PUCCH resources for UCI transmission via higher layer signaling or dynamic control signalling or implicit scheme.

The UE may transmit one or more PUCCHs in one subframe. When the UE is allowed to transmit multiple PUCCHs in one subframe, the multiple PUCCHs may be transmitted in one subframe in a format shown in FIG. 9 or FIG. 10.

Figure 9:
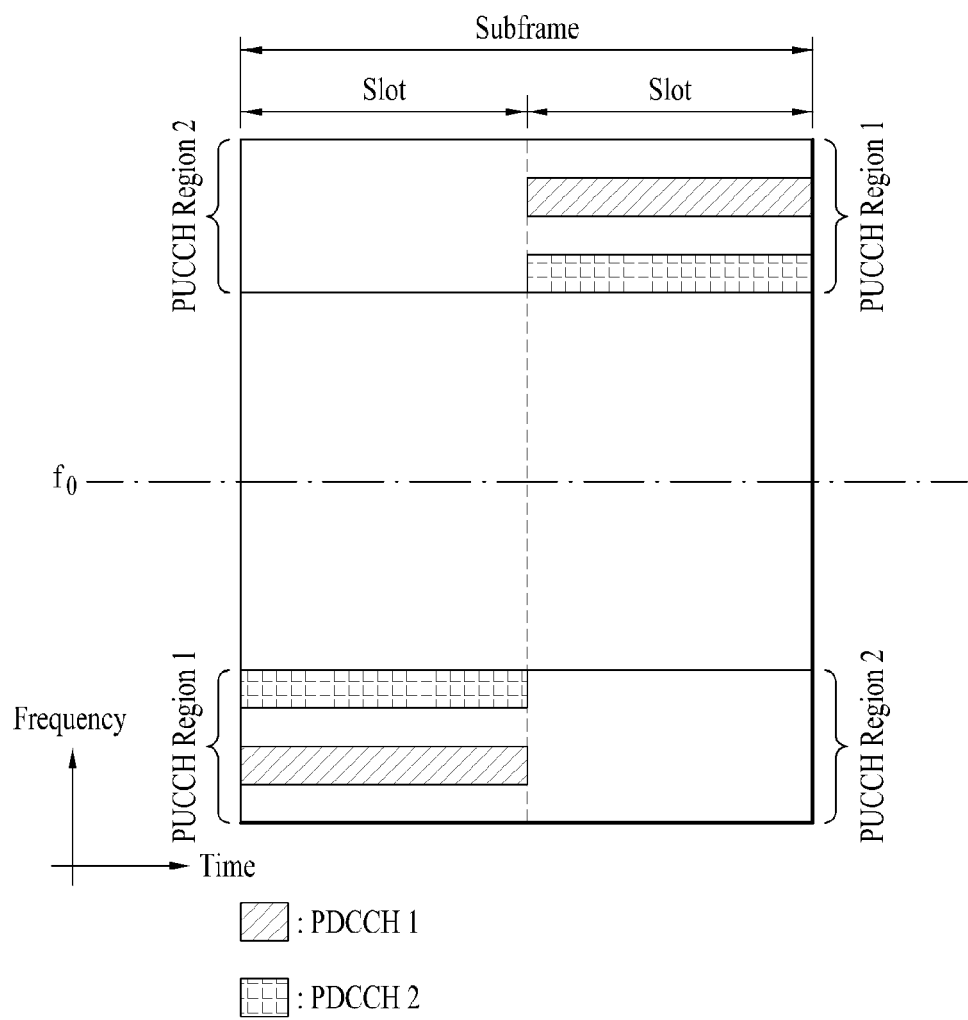
FIG. 9 and FIG. 10 illustrate examples of the UE transmitting multiple PUCCHs from one subframe.
Figure 10:
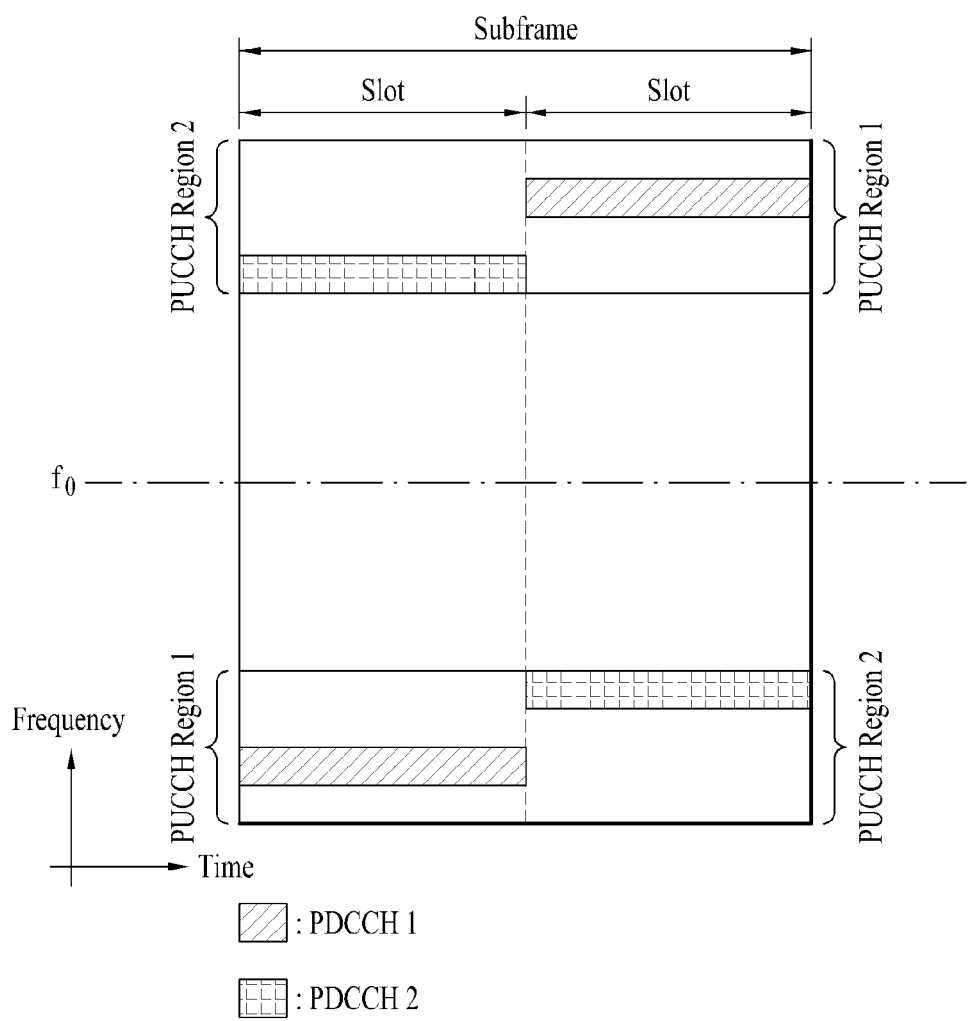

FIG. 9 and FIG. 10 illustrate examples of the UE transmitting multiple PUCCHS in one subframe. Herein, FIG. 9 and FIG. 10 exemplary PUCCH transmissions having frequency-hopping applied thereto. Therefore, depending upon the slot within the one subframe, the directions of the first PUCCH region and the second PUCCH region may be inversed.

Referring to FIG. 9, the UE may use one CC, so as to transmit multiple PUCCHs on the same PUCCH region of each slot within one subframe. More specifically, resources located along the same direction based upon a carrier frequency $f_0$ of each slot are allocated as PUCCH resources for the multiple PUCCHs.

Conversely, referring to FIG. 10, the UE may also transmit multiple PUCCHs on different PUCCH regions of each slot within one subframe. More specifically, resources located along different directions based upon the carrier frequency $f_0$ of each slot may be used as PUCCH resources respective to one UE. In other words, the multiple PUCCHs being transmitted by the UE are transmitted on different side bands, i.e., on different PUCCH regions. However, as described above, when signals are simultaneously transmitted on different frequency positions of a band using a single Power Amplifier (PA), such signals may pass through a non-linear region of the PA, thereby generating Inter-MoDulation (IMD), which corresponds to unwanted emission. Depending upon a frequency distance between two signals, an IMD may be generated in a neighboring region, thereby acting against an SEM (Spectral Emission Mask), or, by being located at a more remote region, such as a spurious domain, the IMD may violate the requirements or spurious emission.

Figure 11:
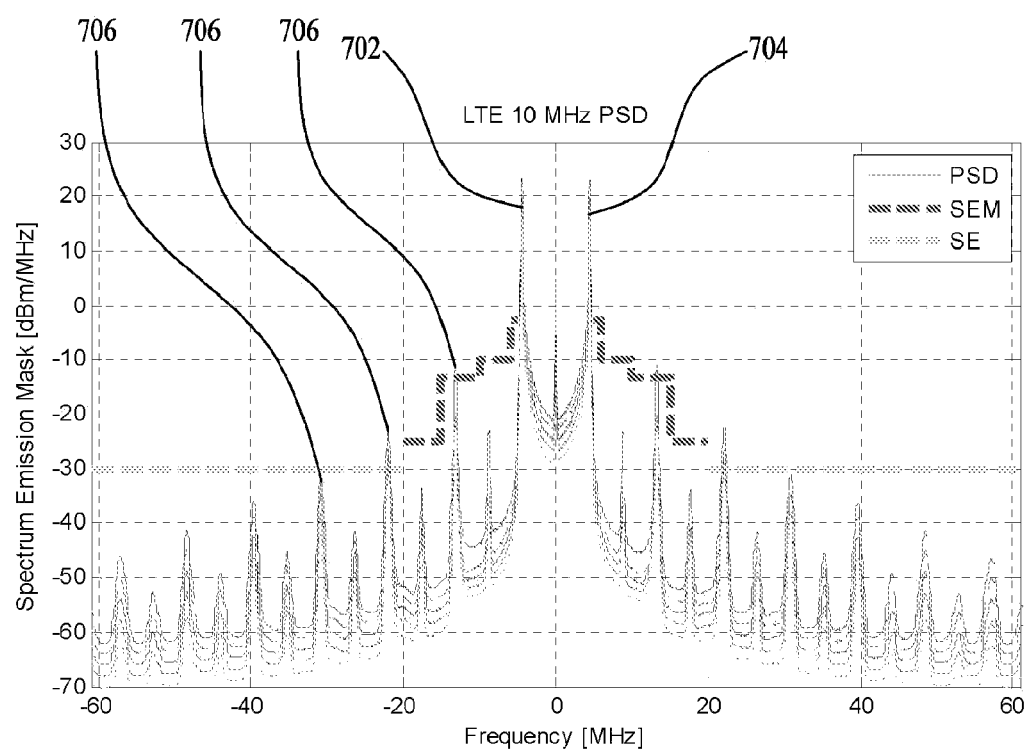
FIG. 11 illustrates an exemplary IMD being generated when two signals are transmitted to both ends of an uplink band.

FIG. 11 illustrates an exemplary IMD being generated when two signals are transmitted to both ends of an uplink band.

Two signals may correspond to PUCCH/PUCCH, PUCCH/PUSCH, PUSCH/PUSCH. In FIG. 11, it is assumed that the band size is equal to 10 MHz (−5 MHz~5 MHz). As shown in FIG. 11, when two signals (e.g., PUCCH/PUCCH) (702 and 704) are respectively transmitted on both ends of the band at a maximum transmission power 23 dBm of the corresponding UE, the conventional LTE SEM (Spectrum Emission Mask) and/or SE (Spurious Emission) may be violated due to the IMD (706). More specifically, due to a large frequency separation between multiple PUCCHs within a slot, inter-modulation components, which are generated as multiple PUCCHs of the UE are simultaneously transmitted on different side bands, may cause a large interference to carriers located outside of the corresponding carriers. Therefore, it will be apparent that, in order to meet with the SEM and SE requirements, a predetermined amount of decrease in the maximum transmission power is required in light of PSD (Power Spectrum Density).

Accordingly, when the UE is allowed to transmit multiple PUCCHs in a subframe, it is preferable that the multiple PUCCH transmission performed by the UE is limited to the same PUCCH region. Exemplary embodiments for limiting the multiple PUCCH transmission performed by the UE is limited to the same PUCCH region are proposed in the description of the present invention. Although the exemplary embodiments of the present invention is mainly focused on cases when PUCCH frequency hopping is used for each slot, the exemplary embodiments of the present invention may also be similarly applied to cases when frequency-hopping is not used.

Embodiment 1

Figure 12:
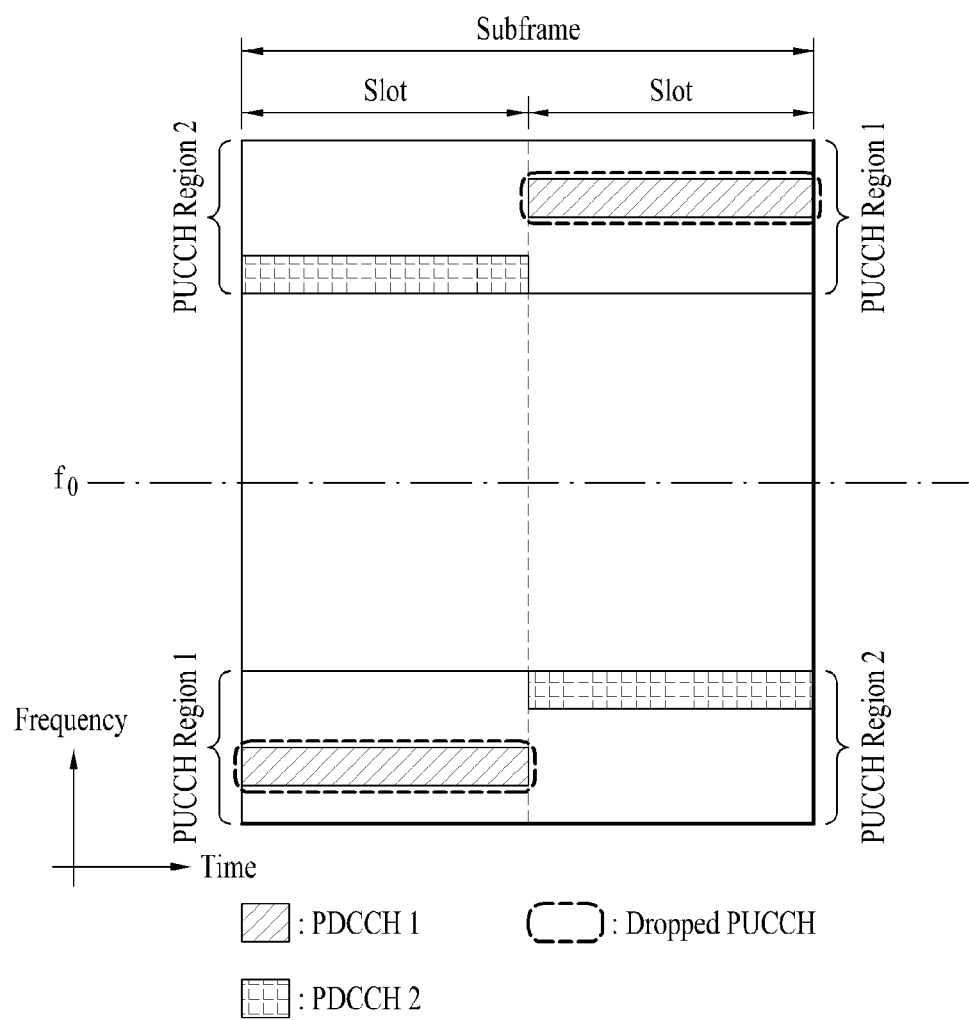
FIG. 12 illustrates an exemplary transmission of multiple PUCCHs according to a first embodiment of the present invention.

FIG. 12 illustrates an exemplary transmission of multiple PUCCHs according to a first embodiment of the present invention.

According to the first embodiment of the present invention, the UE is allocated with any one of a first PUCCH region and a second PUCCH region by using higher layer RRC signaling from a BS or dynamic L1/L2 (MAC) control signaling from a BS or an implicit method. The BS may allocate a PUCCH region with respect to a first slot, or with respect to each slot, or with respect to a subframe. The allocated PUCCH region may be limited only to a case when the UE is required to transmit multiple PUCCHs.

Referring to FIG. 12, for example, the UE may be allocated with the second PUCCH region (PUCCH region 2) as a PUCCH region for the multiple PUCCH transmission. Herein, if the PUCCH resource allocated to the UE is not aligned within the PUCCH region 2, which is allocated to the UE for the multiple PUCCH transmission, the UE may not transmit the corresponding PUCCH, e.g., PUCCH 2, which is not aligned within the PUCCH region 2, in the corresponding subframe. More specifically, in each slot, based upon the allocated PUCCH region and the carrier frequency, the UE may drop the transmission of the PUCCH, which is allocated to the opposite direction.

However, even if the multiple PUCCHs, which are to be transmitted by the UE, are not aligned within the PUCCH region, which is allocated for the purpose of multiple PUCCH transmission, when the multiple PUCCHs are aligned within the same PUCCH region in each slot, the multiple PUCCHs are transmitted in the subframe. For example, referring to FIG. 9, even if it is assumed that the UE has been allocated with PUCCH region 2 for the multiple PUCCH transmission, since all of the PUCCHs that are to be transmitted by the UE are aligned within PUCCH region 1, the UE may transmit the PUCCH 1 and PUCCH 2 in the corresponding subframe without having to drop the transmission of the PUCCH 1 and PUCCH 2.

A processor (400b) of the BS according to the first embodiment of the present invention may allocate a PUCCH region, which is to be used in a PUCCH transmission performed, to a designated UE or UE group in a certain slot or a certain subframe. The BS processor (400b) configures PUCCH region information indicating the PUCCH region by a higher layer RRC signaling, or L1/L1 control signaling, or implicit (e.g., dynamic signaling) format. The BS processor (400b) may also control the BS transmitter (100b), so as to transmit the PUCCH region information to the predetermined UE or UE group. Additionally, the BS processor (400a) may allocate PUCCH resources, which are to be used by the UE or UE group in order to perform UCI transmission, to the UE or UE group. The BS processor (400a) may configure information required by the UE or UE group for deciding the allocated PUCCH resource by using a higher layer signaling or implicit (e.g., dynamic signaling) method, and the BS processor (400a) may control the BS transmitter (100b) so as to transmit the configured information to the UE or UE group.

A UE receiver (300a) receives the PUCCH region information from the BS. The UE processor (400a) decides the PUCCH region, which is allocated to the UE, based upon the PUCCH region information. Additionally, the UE processor (400a) may decide one PUCCH resource or multiple PUCCH resources, which are required for performing UCI transmission, based upon the PUCCH resource information, which is transmitted from the BS to the UE by using a higher layer signaling or implicit (e.g., dynamic signaling) method. The UE processor (400a) may control the UE transmitter (100a) so that the UE transmitter (100a) can drop the transmission of the corresponding PUCCH in the corresponding UL subframe. The UE processor (400a) may use the PUCCH region information, only when multiple PUCCHs are to be transmitted. More specifically, in case that the UE transmits a single PUCCH, the UE processor (400a) may not drop the transmission of the single PUCCH, even if the corresponding single PUCCH exists in a PUCCH region other that the allocated PUCCH region.

Meanwhile, when all of the PUCCHs, which are to be transmitted, are aligned within the same PUCCH region, even if the PUCCH region with which all of the PUCCHs are aligned does not correspond to the PUCCH region allocated by the BS, the UE processor (400a) may not drop the transmission of the corresponding PUCCHs. More specifically, the UE processor (400a) may control the UE transmitter (100a) so that the UE transmitter (100a) can perform PUCCH transmission on the PUCCH region with which the PUCCHs are aligned.

Since the BS processor (400b) is aware of the PUCCH resources that are allocated to the corresponding UE or UE group, the BS processor (400b) is also aware of the specific PUCCH resource through which the corresponding UE or UE group is to transmit the UCI. Accordingly, the BS processor (400b) may control the BS receiver (300b) so that the BS receiver (300b) can receive the UCI, which is transmitted by the corresponding UE or UE group through the corresponding PUCCH resource.

Embodiment 2

Figure 13:
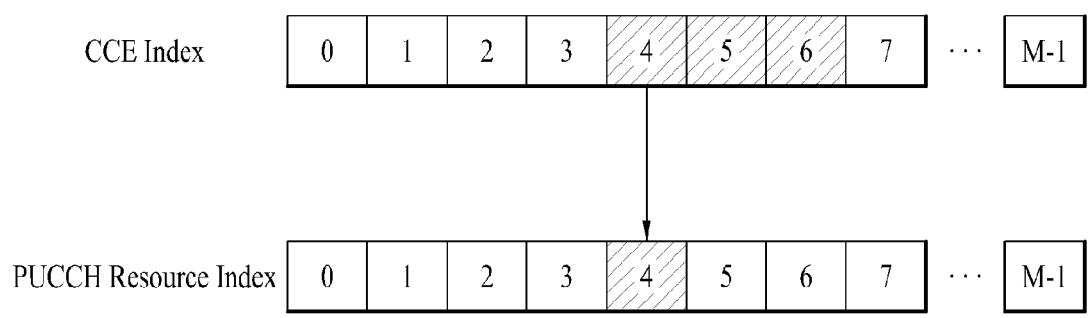
FIG. 13 shows an example for deciding PUCCH resources for ACK/NACK.

FIG. 13 shows an example for deciding PUCCH resources for ACK/NACK.

In the LTE system, PUCCH resources for the ACK/NACK are not pre-allocated to each UE, and several UEs located in the cell are configured to divisionally use several PUCCH resources at every time point. In more detail, PUCCH resources used for ACK/NACK transmission of a UE are implicitly determined on the basis of a PDCCH that carries scheduling information of a PDSCH carrying the corresponding DL data. The entire region through which a PDCCH is transmitted in each DL subframe is comprised of a plurality of Control Channel Elements (CCEs), and a PDCCH transmitted to the UE is comprised of one or more CCEs. The UE may transmit ACK/NACK through a PUCCH resource that is lined to a specific CCE index (e.g., the first CCE index) from among CCEs constructing a PDCCH received by the UE.

Referring to FIG. 13, each PUCCH resource index may correspond to a PUCCH resource for ACK/NACK. As can be seen from FIG. 13, if it is assumed that PDSCH scheduling information is transmitted to the UE through a PDCCH composed of 4~6-indexed CCEs (i.e., NOs. 4, 5, 6 CCEs), the UE transmits ACK/NACK to the BS through the 4-indexed PUCCH corresponding to a CCE having the lowest index (i.e., No. CCE 4) constructing the PDCCH. FIG. 13 shows the example in which a maximum of M' CCEs is present in a DL and a maximum of M PUCCHs is present in a UL. Although M' may be identical to M (M'=M), M' may be different from M as necessary, and CCE resource mapping may overlap with PUCCH resource mapping as necessary.

In the LTE system, PUCCH resource index is given according to the following equation.

$$n_{PUCCH}^{(1)} = n_{CCE} + N_{PUCCH}^{(1)}$$  Equation 1

In Equation 1, $n_{PUCCH}^{(1)}$ is a PUCCH resource index for PUCCH format 1/1a/1b, $N_{PUCCH}^{(1)}$ is a signaling value received from a higher layer, and $n_{CCE}$ may be the smallest value from among CCE indexes used for PDCCH transmission.

As shown in Equation 1, when the ACK/NACK PUCCH resource(s) for the ACK/NACK transmission is/are dynamically decided based upon a PDCCH, which schedules the corresponding PDSCH to the UE, it may be difficult to align a ACK/NACK PUCCH and a PUCCH (hereinafter referred to as other PUCCH), which carries control information having a purpose other than that of the ACK/NACK PUCCH (e.g., CQI, PMI, RI, SR, and so on), within the same PUCCH region.

Figure 14:
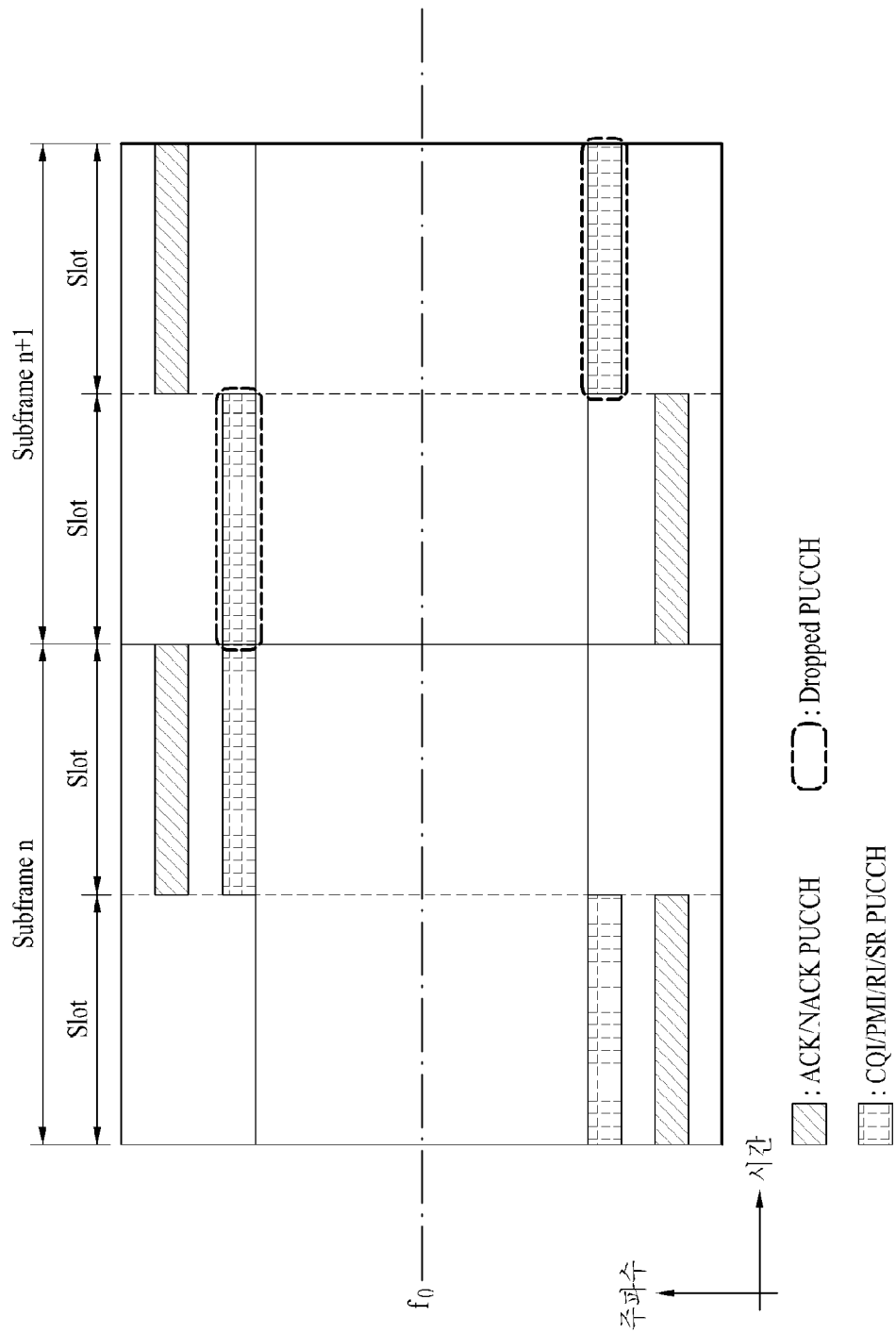
FIG. 14 and FIG. 15 illustrate exemplary multiple PUCCH transmission according to a second embodiment of the present invention.
Figure 15:
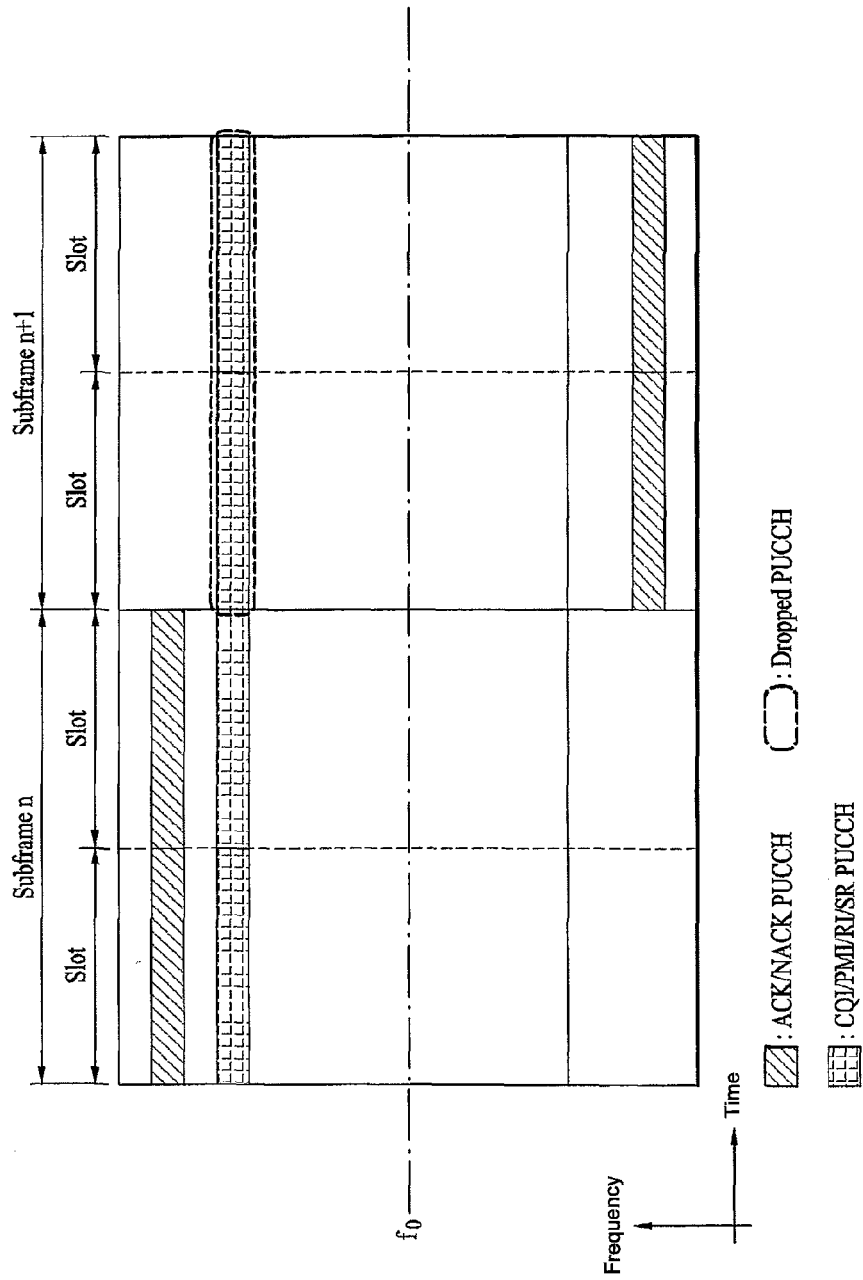

FIG. 14 and FIG. 15 illustrate exemplary multiple PUCCH transmission according to a second embodiment of the present invention. Most particularly, FIG. 14 illustrates a case when PUCCH frequency-hopping is applied, and FIG. 15 illustrates a case when PUCCH frequency-hopping is not applied.

In order to resolve the above-described disadvantages, according to the second embodiment of the present invention, when the ACK/NACK PUCCH and the other PUCCH are located in different PUCCH regions, i.e., when the ACK/NACK PUCCH and the other PUCCH are located in opposite directions based upon the carrier frequency within each slot, the UE may drop the transmission of the other PUCCH in the corresponding subframe.

Referring to FIG. 14 and FIG. 15, in subframe n, the ACK/NACK PUCCH and the other PUCCH are positioned along the same direction based upon the carrier frequency within each slot. More specifically, in subframe n, the ACK/NACK PUCCH and the other PUCCH both belong to the same PUCCH region (or domain). Accordingly, the UE may transmit both the ACK/NACK PUCCH and the other PUCCH in subframe n to the BS.

However, in subframe n+1, the ACK/NACK PUCCH and the other PUCCH are positioned in opposite directions based upon the carrier frequency within each slot. More specifically, in subframe n+1, the ACK/NACK PUCCH and the other PUCCH belong to different PUCCH regions. In this case, according to the second embodiment of the present invention, the UE drops the transmission of the PUCCH(s) belonging to the PUCCH region which is different from the PUCCH region to which the ACK/NACK PUCCH belongs. And, the UE transmits the PUCCH belonging to the same PUCCH region to which the ACK/NACK PUCCH belongs.

According to the second embodiment of the present invention, when the ACK/NACK PUCCH and the other PUCCH belong to different PUCCH regions, the transmission of the other PUCCH may be dropped not only in the corresponding subframe but also in a predetermined number of subframes including the corresponding subframe. For example, referring to FIG. 14 and FIG. 15, in addition to the subframe n+1, the transmission of the PUCCH belonging to a PUCCH region other than that of the ACK/NACK PUCCH may also be dropped in subframe n in which the ACK/NACK PUCCH and the other PUCCH belong to the same PUCCH region. The other PUCCH may be dropped in subframe n and in a predetermined number of subframes previous to and following subframe n. Alternatively, the other PUCCH may be dropped in subframe n and in a predetermined number of subframes previous to subframe n. Or, the PUCCH may be dropped in subframe n and in a predetermined number of subframes following subframe n. Herein, the predetermined number may correspond to a pre-defined value, or the predetermined number may also correspond to a value being configured by a higher layer (e.g., RRC layer, MAC layer, and so on) and being signaled to the UE.

A processor (400b) of the BS according to the second embodiment of the present invention may allocate PUCCH resources, which are to be used by a UE or UE group for a UCI transmission, to the UE or UE group. The BS processor (400a) may configure information, which is required by the UE or UE group for deciding the PUCCH resource allocated thereto, by using a higher layer signaling or implicit method. And, then, the BS processor (400a) may control the BS transmitter (100b) so as to transmit the configured information to the UE or UE group. For example, by configuring a PDCCH having a first CCE as a specific CCE, the BS processor (100b) may signal the ACK/NACK PUCCH resource, which is to be used by the UE or UE group in order to perform ACK/NACK transmission, to the UE or UE group in an implicit manner.

The UE receiver (300a) receives the PUCCH resource information transmitted by the BS to the UE by using the higher layer signaling or implicit method. The UE processor (400a) may decide one or more PUCCH resources that is/are required for the UCI transmission, based upon the PUCCH resource information.

When the multiple PUCCH resources belong to the same PUCCH region within a subframe, the UE processor (400a) controls the UE transmitter (100a), so that the UE transmitter (100a) can transmit all of the UCIs, which are allocated to the multiple PUCCH resources, in the subframe. However, in case the multiple PUCCH resources belong to different PUCCH regions within a subframe, the UE processor (400a) may control the UE transmitter (100a) so that the UE transmitter (100a) can transmit the UCIs, which are allocated to the ACK/NACK PUCCH resource and to PUCCH resources belonging to the same PUCCH region as the ACK/NACK PUCCH. Yet, in this case, the UE transmitter (100a) is controlled so that the transmission of the UCIs, which are allocated to the PUCCH resources belonging to the other PUCCH region, can be dropped.

The UE processor (400a) may control the UE transmitter (100a) so that the UE transmitter (100a) can drop the transmission of the different types of UCI, not only in a subframe, wherein the ACK/NACK PUCCH resource for transmitting the ACK/NACK and the PUCCH resource for transmitting different types of UCIs (e.g., CQI, PMI, RI, SR, and so on) belong to different PUCCH regions, but also in a predetermined number of subframes previous to and/or following the above-described subframe.

Since the BS processor (100b) is aware of the specific PUCCH resource on which the UCI of the UE is to be transmitted, the BS processor (100b) may control the BS receiver (300b), so that the BS receiver (300b) can receive the UCI of the UE on the corresponding PUCCH resource. When multiple PUCCHs belong to the same PUCCH region, the BS receiver (300b) may be capable of receiving a UCI on all of the PUCCH resources allocated to the UE. However, since the transmission of the PUCCH belonging to a PUCCH region other than that of the ACK/NACK PUCCH, from among the multiple PUCCHs that are to be transmitted by the UE, is dropped, the BS receiver (300b) may be unable to receive the UCI of the UE on the PUCCH resource belonging to the other PUCCH region.

As described above, in an LTE system, it will be difficult to limit the ACK/NACK PUCCH transmission respective to the dynamically scheduled PDSCH to a specific PUCCH region. Hereinafter, a method for allocating an ACK/NACK PUCCH respective to the dynamically scheduled PDSCH to a specific PUCCH region according to a third embodiment to a sixth embodiment of the present invention will be described in detail. More specifically, the third to sixth embodiments of the present invention will be described based upon the PUCCH region, which is configured as shown in FIG. 16.

Figure 16:
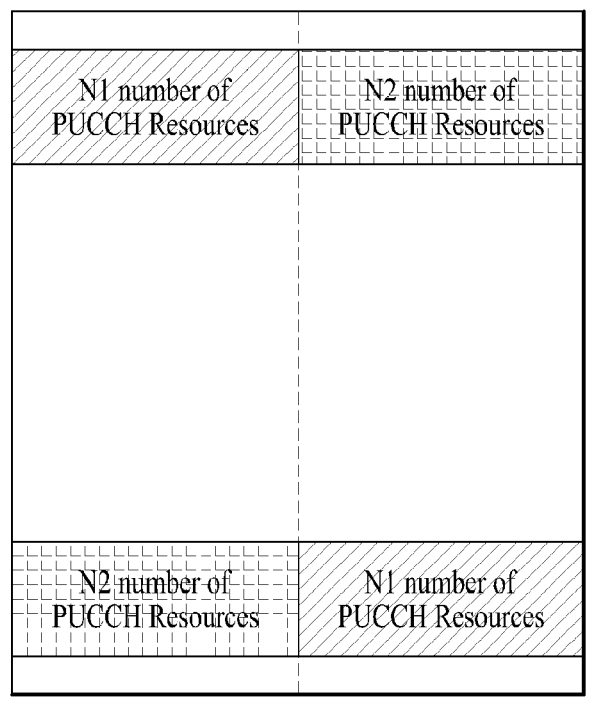
FIG. 16 illustrates an exemplary configuration of 2 PUCCH regions within one subframe.

FIG. 16 illustrates an exemplary configuration of 2 PUCCH regions within one subframe. Most particularly, FIG. 16 illustrates an exemplary PUCCH region configuration, when a frequency-hopping is applied. When a total of N number of PUCCH resources exist in each slot of the subframe, it will be assumed that PUCCH region 1 and PUCCH region 2 are respectively configured of N1 number of PUCCH resources and N2 number of PUCCH resources. Herein, N=N1+N2. Herein, N1 and N2 may be the same value, or may be different values.

Figure 17:
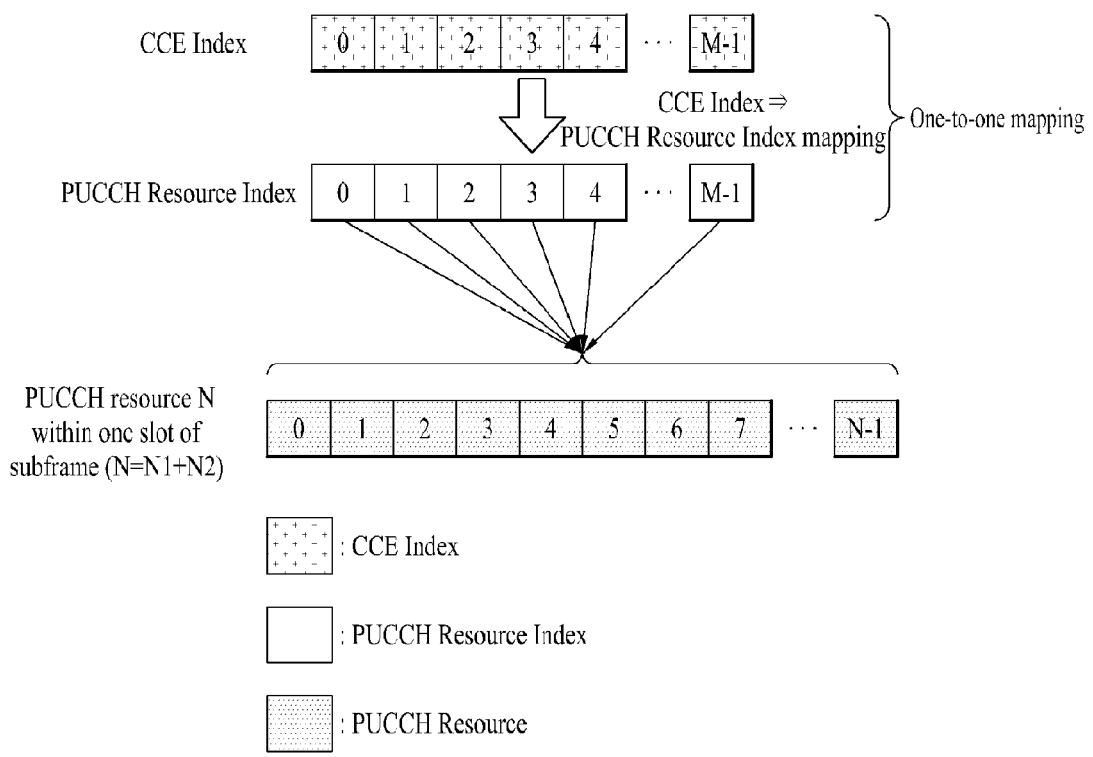
FIG. 17 and FIG. 18 illustrate exemplary PUCCH resource index and PUCCH resource mapping.
Figure 18:
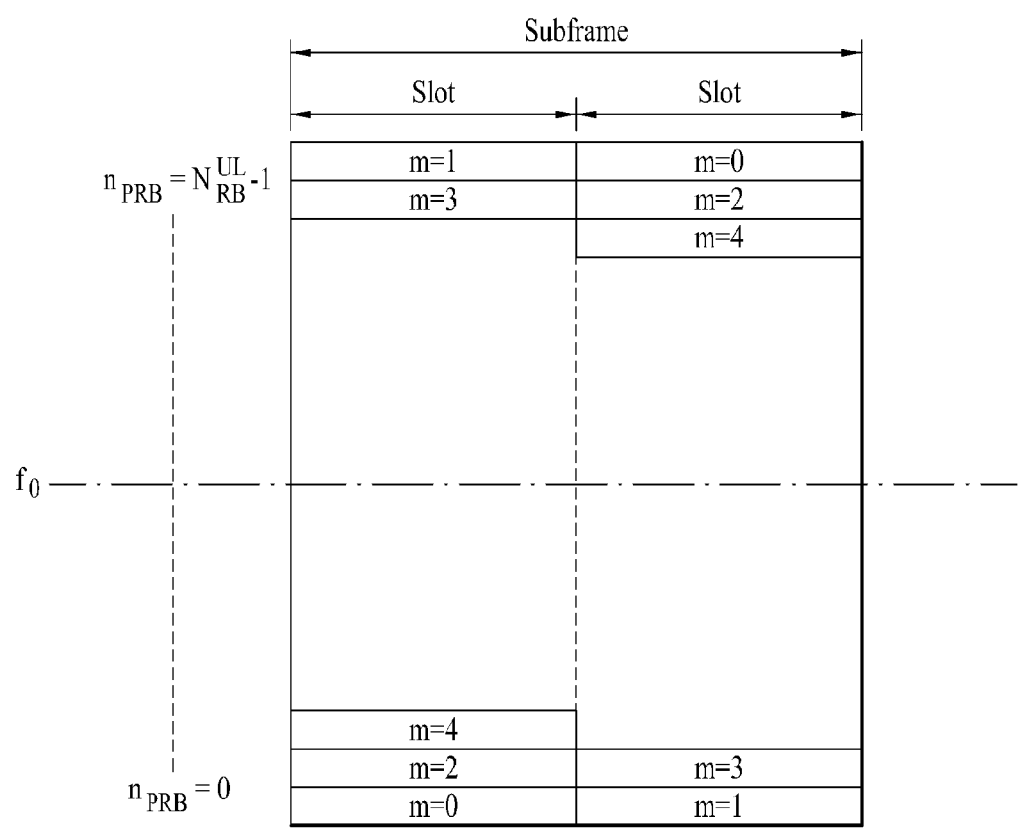

FIG. 17 and FIG. 18 illustrate exemplary PUCCH resource index and PUCCH resource mapping.

In the LTE system, when a maximum M number of CCEs can exist in a DL subframe, a maximum M number of ACK/NACK PUCCH indexes may be decided. In accordance with Equation 1, each ACK/NACK PUCCH index may be linked to each CCE index. And, the UE may receive a PDCCH respective to PDSCH scheduling. And, the UE may transmit the ACK/NACK over a PUCCH resource of which PUCCH resource index is linked to the first CCE from among the CCEs configuring the PDCCH.

According to Equation 1, the UE may decide a PUCCH resource index that is used to transmit the ACK/NACK. Also, depending upon Equation 2 and Equation 3, the UE may map one PUCCH resource index to one Resource Block (RB), which corresponds to an actual PUCCH resource.

A variable m may be respectively defined for PUCCH format 1/1a/1b and 2/2a/2b, by using Equation 2 and Equation 3 shown below. Herein, Equation 2 indicates a variable m respective to PUCCH format 1/1a/1b, and Equation 3 indicates a variable m respective to PUCCH format 2/2a/2b.

$$m = \begin{cases} N_{RB}^{(2)} & \text{if } n_{PUCCH}^{(1)} < c \cdot \dfrac{N_{cs}^{(1)}/\Delta_{shift}^{PUCCH}}{} \\ \left\lfloor \dfrac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB}^{(2)} + \left\lceil \dfrac{N_{cs}^{(1)}}{8} \right\rceil & \end{cases} \quad \text{Equation 2}$$

$$c = \begin{cases} 3 & \text{normal cyclic prefix} \\ 2 & \text{extended cyclic prefix} \end{cases}$$

$$m = \lfloor n_{PUCCH}^{(2)}/N_{sc}^{RB} \rfloor \quad \text{Equation 3}$$

In Equation 2, $N^{(2)}_{RB}$ indicates a bandwidth available by PUCCH format 2/2a/2b and may be expressed as a multiple of $N^{RB}_{sc} \cdot n^{(1)}_{PUCCH}$ corresponds to a PUCCH resource index for PUCCH format 1/1a/1b. And, in case of ACK/NACK PUCCH, in accordance with Equation 1, $n^{(1)}_{PUCCH}$ may correspond to a value that is decided by the first CCE of the PDCCH, which carries the scheduling information of the corresponding PDSCH. Along with the combination of PUCCH format 1/1a/1b and 2/2a/2b, $N^{(1)}_{cs}$ indicates a number of cyclic shifts used for PUCCH format 1/1a/1b in one resource block. And, in Equation 3, as a PUCCH resource index for PUCCH format 2/2a/2b, $n^{(2)}_{PUCCH}$ corresponds to a value being transmitted from the BS to the UE by using a higher layer signaling.

In slot $n_s$, a Physical Resource Block (PRB) used for the PUCCH transmission is given as shown below.

$$n_{PRB} = \begin{cases} \left\lfloor \dfrac{m}{2} \right\rfloor & \text{if } (m+n_s \bmod 2) \bmod 2 = 0 \\ N_{RB}^{UL} - 1 - \left\lfloor \dfrac{m}{2} \right\rfloor & \text{if } (m+n_s \bmod 2) \bmod 2 = 1 \end{cases} \quad \text{Equation 4}$$

Herein, $N^{UL}_{RB}$ indicates a number of RBs in an uplink slot.

According to Equation 1 to Equation 4, the mapping of the modulation symbols for the PUCCH is shown in FIG. 18. Referring to FIG. 18, the PUCCH resource index in each slot increases along a direction starting from each end of the UL bandwidth belonging to the corresponding CC towards the center. More specifically, the PUCCH resource located further away from the carrier frequency $f_0$ corresponds to a lower PUCCH resource index, and the PUCCH resource located closer to the carrier frequency $f_0$ corresponds to a higher PUCCH resource index.

According to Equation 1 to Equation 4, CCE indexes are mapped to N number of resources belonging to PUCCH region 1 and PUCCH region 2 within each slot. In this case, it will be difficult to align the ACK/NACK PUCCHs of one UE within one PUCCH region of a slot. Accordingly, according to the present invention, the CCE indexes are mapped to each PUCCH region, instead of being mapped to the entire PUCCH region (PUCCH region 1+PUCCH region 2), so that the ACK/NACK PUCCHs of one UE can be aligned in the same PUCCH region. Furthermore, by allocating one PUCCH region to the UE or UE group, the ACK/NACK PUCCH for one UE may be limited to the allocated PUCCH region. The above-described method according to the third embodiment to the sixth embodiment of the present invention will be described in more detail with reference to FIG. 19 to FIG. 22.

Embodiment 3

Figure 19:
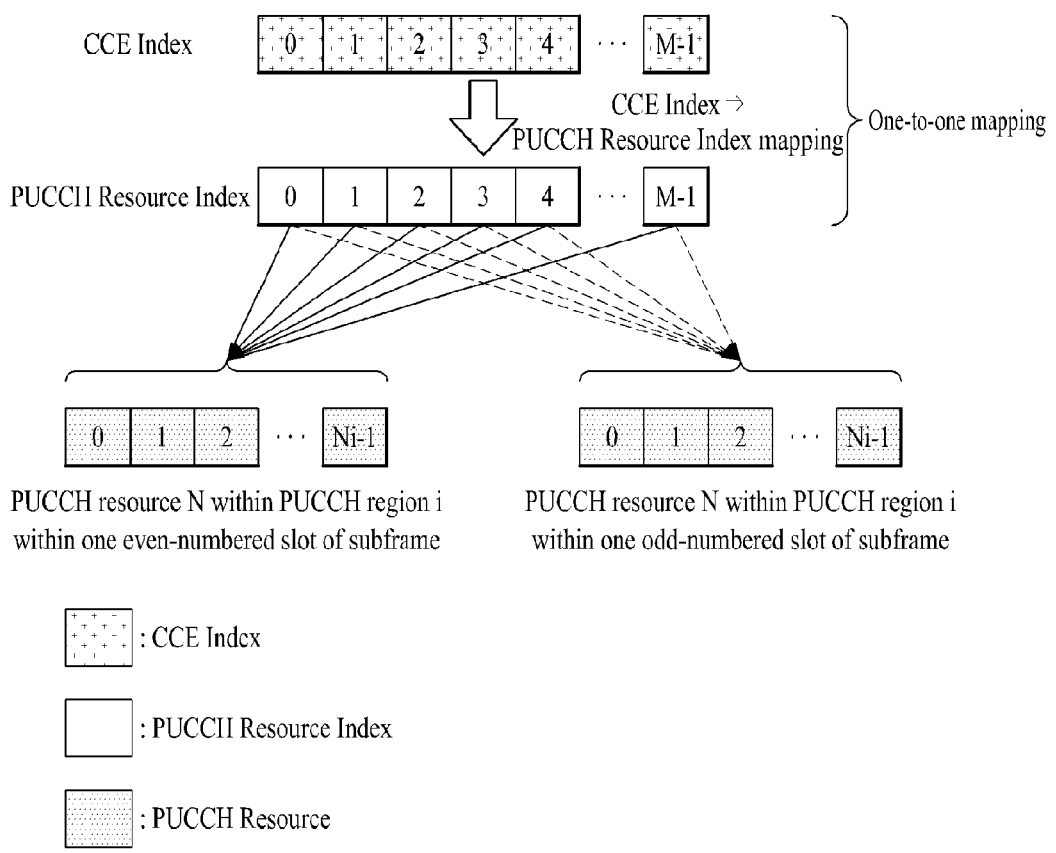
FIG. 19 illustrates a method for mapping a CCE index to a PUCCH resource index and a method for mapping a PUCCH resource index to a PUCCH resource according to a third embodiment of the present invention.

FIG. 19 illustrates a method for mapping a CCE index to a PUCCH resource index and a method for mapping a PUCCH resource index to a PUCCH resource according to a third embodiment of the present invention.

As defined in the conventional LTE system, according to the third embodiment of the present invention, the CCE resource index is mapped to the PUCCH resource index at a one-to-one correspondence. For example, the CCE resource index and the PUCCH resource index at a one-to-one correspondence in accordance with Equation 1. However, according to the third embodiment of the present invention, instead of mapping the PUCCH resource indexes to N number of PUCCH resources, which corresponds to a total sum of the PUCCH resources included in 2 PUCCH regions within each slot, the PUCCH resource indexes are mapped to the PUCCH resources of the corresponding PUCCH region.

Referring to FIG. 19, for example, with respect to M number of CCE indexes within a DL subframe, a maximum M number of PUCCH resource indexes is defined in accordance with Equation 1. The M number of PUCCH resource indexes are respectively mapped to N1 number of PUCCH resources included in PUCCH region 1. Additionally, the M number of PUCCH resource indexes are also respectively mapped to N2 number of PUCCH resources included in PUCCH region 2. Accordingly, at least 2 PUCCH resources having the same PUCCH resource index—1 PUCCH resource in each PUCCH resource—may exist in each slot.

Embodiment 4

Figure 20:
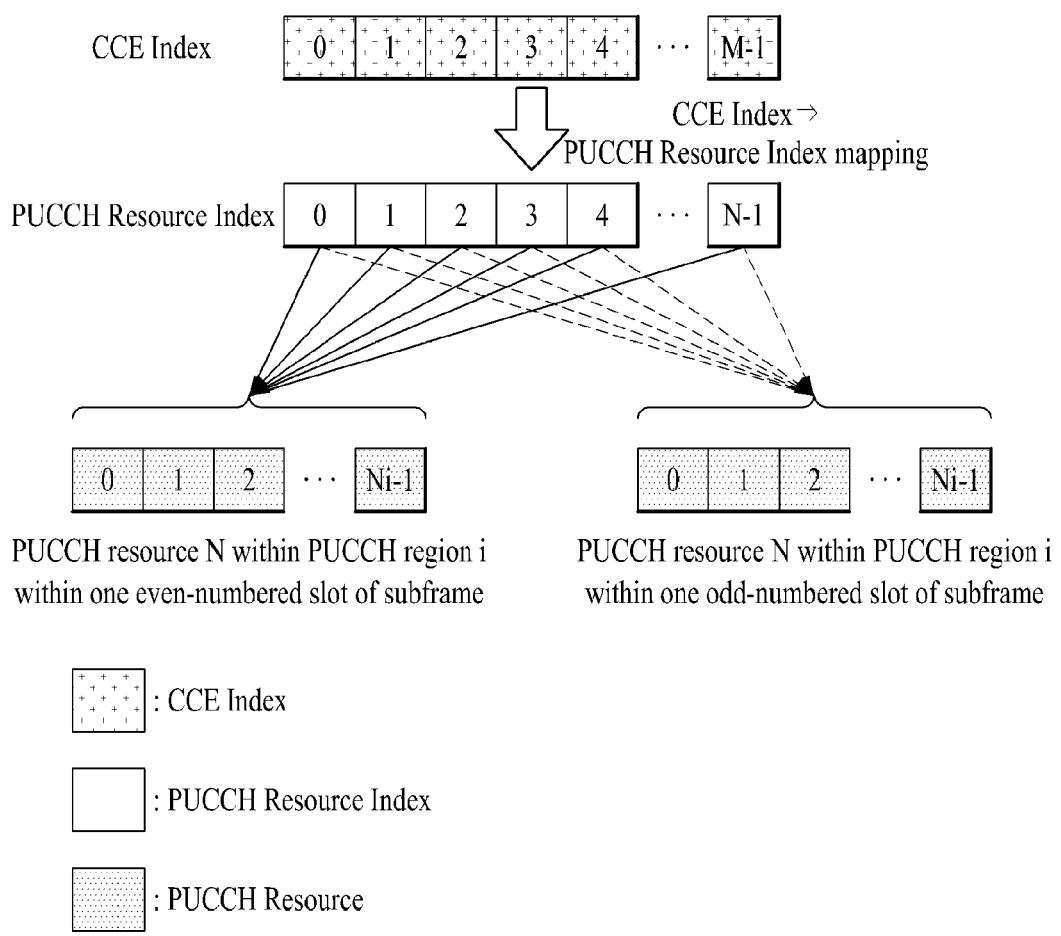
FIG. 20 illustrates a method for mapping a CCE index to a PUCCH resource index and a method for mapping a PUCCH resource index to a PUCCH resource according to a fourth embodiment of the present invention.

FIG. 20 illustrates a method for mapping a CCE index to a PUCCH resource index and a method for mapping a PUCCH resource index to a PUCCH resource according to a fourth embodiment of the present invention.

Unlike the conventional LTE system, according to the fourth embodiment of the present invention, the CCE resource index may not be mapped to the PUCCH resource index at a one-to-one correspondence. When the number of CCE resources is greater than the PUCCH resource index, i.e., when M>N, some of the PUCCH resource indexes may be mapped to more than one CCE index. On the other hand, when M<N, N−M number of PUCCH resource indexes are not used for the dynamic ACK/NACK transmission. In any of the above-described cases, among the N number of PUCCH resource indexes, M number of PUCCH resource indexes, wherein M corresponds to the number of CCE indexes, may be linked to the CCE index.

As described in the method according to the third embodiment of the present invention, instead of mapping N number of PUCCH resource indexes to N number of PUCCH resources, which corresponds to a total sum of the PUCCH resources included in 2 PUCCH regions within each slot, PUCCH resource indexes may be mapped to PUCCH resources for each PUCCH region.

Referring to FIG. 20, the N number of PUCCH resource indexes may be mapped to N1 number of PUCCH resources, which are included in PUCCH region 1. Additionally, the N number of PUCCH resource indexes may also be mapped to N2 number of PUCCH resources, which are included in PUCCH region 2. Accordingly, at least 2 PUCCH resources having the same PUCCH resource index—1 PUCCH resource per PUCCH region—may exist in each slot.

However, among the N number of PUCCH resource indexes, since M number of PUCCH resource indexes are actually mapped to the CCE index, when M<N, there may exist some PUCCH resources that are not linked to the CCE index(es). More specifically, when M<N, among the PUCCH resources within each PUCCH region, there may exist some PUCCH resources that cannot be used for the ACK/NACK transmission.

Embodiment 5

Figure 21:
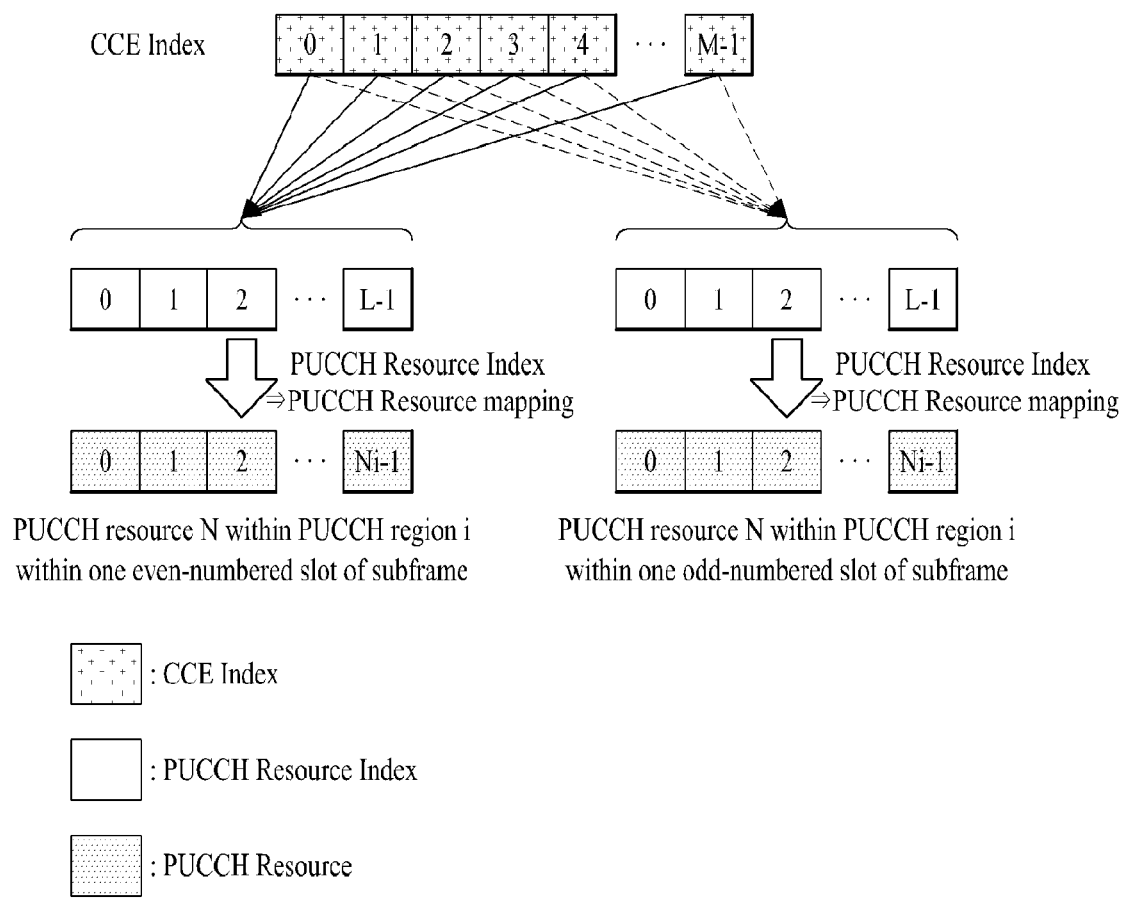
FIG. 21 illustrates a method for mapping a CCE index to a PUCCH resource index and a method for mapping a PUCCH resource index to a PUCCH resource according to a fifth embodiment of the present invention.

FIG. 21 illustrates a method for mapping a CCE index to a PUCCH resource index and a method for mapping a PUCCH resource index to a PUCCH resource according to a fifth embodiment of the present invention.

According to the fifth embodiment of the present invention, M number of CCE indexes may be mapped to L number of PUCCH resource indexes. Herein, the value L may correspond to a pre-decided value between the BS and the UE, or the value L may correspond to a value transmitted from the BS to the UE by using a higher layer RRC signaling method or an L1/L2 control signaling method. The L number of resource indexes may be mapped to the PUCCH resources within each PUCCH region.

Referring to FIG. 21, L number of resource indexes, which is linked to M number of CCE indexes, are mapped to N1 number of PUCCH resources, which are included in PUCCH region 1. Additionally, L number of resource indexes are mapped to N2 number of PUCCH resources, which are included in PUCCH region 2. Accordingly, at least 2 PUCCH resources being mapped to the same PUCCH resource index may exist in each slot.

Meanwhile, in the method according to the third embodiment to the fifth embodiment of the present invention, in order to eliminate the need for incrementing (or increasing) the number of PUCCH resources within each PUCCH region in accordance with the number of PUCCH resource indexes, when the N1 number of PUCCH resources (herein, Ni corresponds to N1 or N2) within the PUCCH region i (herein, i=1 or i=2) is smaller than the number of PUCCH resource indexes, at least one or more PUCCH resources may be linked to multiple CCE indexes. In this case, among the PUCCH resource indexes, a number of PUCCH resource indexes, which is equivalent to a difference value between the number of PUCCH resource indexes and the number Ni of PUCCH resources within the corresponding PUCCH region 1 (Mi−Ni, in case of the third embodiment of the present invention, N−Ni, in case of the fourth embodiment of the present invention, and L−Ni, in case of the fifth embodiment of the present invention), may share PUCCH resource(s) with other PUCCH resource indexes.

Embodiment 5

Figure 22:
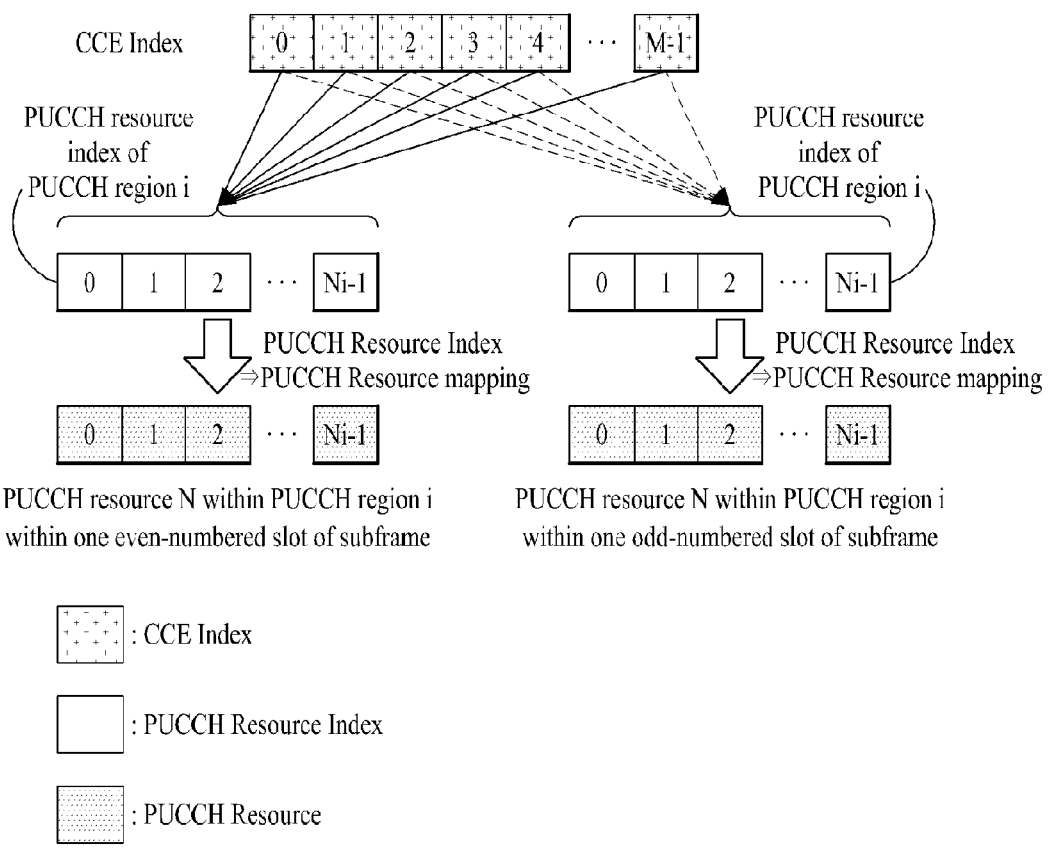
FIG. 22 illustrates a method for mapping a CCE index to a PUCCH resource index and a method for mapping a PUCCH resource index to a PUCCH resource according to a sixth embodiment of the present invention.

FIG. 22 illustrates a method for mapping a CCE index to a PUCCH resource index and a method for mapping a PUCCH resource index to a PUCCH resource according to a sixth embodiment of the present invention.

Unlike the above-described method according to the sixth embodiment of the present invention, in the method according to the sixth embodiment of the present invention, Ni number of PUCCH resource indexes is defined to be in a one-to-one correspondence with the Ni number of PUCCH resources included in PUCCH region i. Herein, the Ni number of PUCCH resource indexes is linked to M number of CCE indexes, each indicating the M number of CCEs.

Referring to FIG. 22, the M number of CCE indexes are mapped to N1 number of PUCCH resource indexes, which are respectively mapped to N1 number of PUCCH resources included in PUCCH region 1 at a one-to-one correspondence. Additionally, the M number of CCE indexes are mapped to N2 number of PUCCH resource indexes, which are respectively mapped to N2 number of PUCCH resources included in PUCCH region 2 at a one-to-one correspondence. Accordingly, at least 2 PUCCH resource indexes being linked/mapped to the same CCE index may each exist in each slot. According to the method according to the fifth embodiment of the present invention, since the PUCCH resource indexes and the PUCCH resources are in a one-to-one correspondence, it may be defined that, at least 2 PUCCH resources being linked or mapped to the same CCE index may each exist in each slot.

Meanwhile, in the method according to the sixth embodiment of the present invention, in order to eliminate the need for incrementing (or increasing) the number of PUCCH resources within each PUCCH region in accordance with the number of CCE indexes, when the Ni number of PUCCH resources within the PUCCH region i is smaller than the number of CCE indexes M, at least one or more PUCCH resource indexes may be mapped to multiple CCE indexes. In this case, among the M number of CCE indexes, M−Ni number of CCE indexes may share the PUCCH resource index(es) with other CCE index(es).

According to the third embodiment to the sixth embodiment of the present invention, since the PDCCH being transmitted to the UE may be configured of a plurality of consecutive CCEs, in order to prevent dynamic ACK/NACK PUCCH resources between different UEs from conflicting with one another, consecutive PUCCH resource indexes may be mapped to the same PUCCH resource within each PUCCH region.

Meanwhile, in the method according to the third embodiment and the fourth embodiment of the present invention, in order to eliminate the need for incrementing (or increasing) the number of PUCCH resources within each PUCCH region in accordance with the number of PUCCH resource indexes, when the Ni number of PUCCH resources (herein, Ni corresponds to N1 or N2) within the PUCCH region i (herein, i=1 or i=2) is smaller than the number of PUCCH resource indexes, at least a number of PUCCH resources, which is equivalent to a difference value between the number of PUCCH resource indexes and the number Ni of PUCCH resources within the corresponding PUCCH region i, may be mapped to multiple PUCCH resource indexes.

Additionally, since the PDCCH being transmitted to the UE may be configured of a plurality of consecutive CCEs, in order to prevent dynamic ACK/NACK PUCCH resources between different UEs from conflicting with one another, according to the third embodiment of the present invention, consecutive PUCCH resource indexes may be mapped to the same PUCCH resource within each PUCCH region.

According to any one of the third embodiment and the sixth embodiment of the present invention, when the CCE index, the PUCCH resource index, and the PUCCH resource are mapped to one another, as described in the method according to the first embodiment of the present invention, by being assigned with information indicating which PUCCH region should be allocated so as to perform a dynamic ACK/NACK transmission, by using a higher layer RRC signaling from the BS or an L1/L2 control signaling from the BS or an implicit manner, the UE may be limited to perform ACK/NACK transmission only at a specific side band, i.e., on a specific PUCCH region. More specifically, according to the first embodiment of the present invention, when the UE is allocated with a PUCCH region for multiple PUCCH transmission, and when a PUCCH resource for performing dynamic ACK/NACK transmission is decided, according to any one of the third embodiment to the sixth embodiment of the present invention, the UE may be capable of transmitting multiple dynamic ACK/NACK PUCCHs to the BS on the same PUCCH region.

Meanwhile, the third embodiment to the sixth embodiment of the present invention may be used in combination with the second embodiment of the present invention. When the ACK/NACK PUCCH and the other PUCCH (e.g., CQI/PMI/RI/SR PUCCH) belong to different PUCCH regions, the transmission of the other PUCCH may be dropped in the corresponding subframe, and the ACK/NACK PUCCH may be transmitted. However, when multiple dynamic ACK/NACK PUCCHs are to be transmitted, and when the ACK/NACK PUCCHs belong to different PUCCH regions, which ACK/NACK PUCCH is to be assigned with the first transmission priority becomes a crucial issue. However, according to any one of the third embodiment to sixth embodiment of the present invention, when the dynamic ACK/NACK PUCCH resource is decided, since all ACK/NACK PUCCHs are aligned in a single PUCCH region, the UE may be capable of transmitting all dynamic ACK/NACK PUCCHs, which are to be fed-back to the BS, on the same side band within each slot.

According to any one of the third embodiment to sixth embodiment of the present invention, the BS may allocate a PUCCH region for ACK/NACK transmission to a certain UE or a certain UE group, and the BS may then notify the UE or the UE group of such allocation by using a higher layer signaling or implicit manner. Additionally, the BS may allocate a PUCCH region for ACK/NACK transmission to a UE or a UE group, and the BS may then notify the UE or the UE group of such allocation by using an explicit signaling or an implicit signaling. For example, by using a certain CCE as a specific CCE (e.g., first CCE) of the PDCCH carrying scheduling information of a PDSCH being the counterpart of the ACK/NACK, the BS may implicitly signal the PUCCH resource, which is scheduled to carry the ACK/NACK, to the UE or UE group.

The UE may decide the PUCCH region, which is allocated to the UE by the BS, based upon the information on the PUCCH region transmitted by the BS by using the higher layer signaling or the implicit signaling. According to any one of the third embodiment to sixth embodiment of the present invention, the UE may decide the PUCCH resource that is used to transmit the ACK/NACK, from among the PUCCH resources within the allocated PUCCH region. For example, according to any one of the third embodiment to sixth embodiment of the present invention, the UE may map an index of a CCE, which corresponds to a specific order configuring the PDCCH (e.g., first CCE), to a PUCCH index. Additionally, by deciding the PUCCH resource, which is mapped to the corresponding PUCCH index, from among the PUCCH resources included in the PUCCH region allocated by the BS, according to any one of the third embodiment to sixth embodiment of the present invention, an ACK/NACK PUCCH resource, which is used to transmit the corresponding ACK/NACK, may be decided.

The UE may transmit an ACK/NACK respective to the PDSCH of a PDCCH having the CCE, which is mapped or linked to the ACK/NACK PUCCH resource, as a specific CCE (e.g., a PDCCH having the first CCE), to the BS. At this point, according to the second embodiment of the present invention, the UE may drop the transmission of the PUCCH belonging to a PUCCH region, which is different from a PUCCH region the ACK/NACK PUCCH belongs to, in each slot.

Since the BS knows the specific PUCCH resource, through which the UE is to transmit the ACK/NACK and/or other control information (e.g., CQI, PMI, RI, SR, and so on), the BS may receive the UCI(s) of the UE using the corresponding PUCCH resource. However, the BS may not be capable of receiving the UCI of the UE on the PUCCH on which the UCI transmission has been dropped by the UE.

The processor (400b) of the BS according to any one of the third embodiment to the sixth embodiment of the present invention, may allocate a PUCCH region for an ACK/NACK transmission to a UE or a UE group. Additionally, the BS processor (400b) may control the BS transmitter (100b), so as to notify the UE or UE group of the allocated PUCCH region by using a higher layer signaling or an implicit signaling. Moreover, the BS processor (400b) may allocate a PUCCH region for an ACK/NACK transmission to a UE or a UE group. And, the BS processor (400b) may then control the BS transmitter (100b) so as to signal information on the allocated PUCCH resource to the UE or UE group of the allocated PUCCH region by using an explicit or implicit signaling. For example, the BS processor (400b) may configure a PDCCH, so that the PDCCH can be configured to have a CCE corresponding to a specific order (e.g., first CCE). By controlling the BS transmitter (100b), so that the BS transmitter (100b) can transmit scheduling information of a PDSCH being the counterpart of the ACK/NACK through the PDCCH to the UE or UE group, the BS processor (400b) may implicitly signal the PUCCH resource, which is scheduled to carry the ACK/NACK, to the UE or UE group.

The UE receiver (300a) may receive information on the PUCCH region, being transmitted from the BS by using the higher layer signaling or implicit signaling. The UE processor (400a) may decide the PUCCH region allocated to the UE by the BS based upon the received information. According to any one of the third embodiment to the sixth embodiment of the present invention, the UE processor (400a) may decide the PUCCH resource, which is used to transmit the ACK/NACK, from among the PUCCH resources included in the allocated PUCCH region. For example, according to any one of the third embodiment to the sixth embodiment of the present invention, the UE processor (400a) may map an index of a CCE corresponding to a specific order configuring the PDCCH (e.g., first CCE) to a PUCCH index. Additionally, by deciding a PUCCH resource, which is mapped to the corresponding PUCCH index, from among the PUCCH resources included in the PUCCH region allocated by the BS, according to any one of the third embodiment to the sixth embodiment of the present invention, the UE processor (400a) may decide the PUCCH resource that is used to transmit the corresponding ACK/NACK.

The UE processor (400a) may control the UE transmitter (100a), so that the UE transmitter (100a) can transmit the ACK/NACK respective to the PDSCH of a PDCCH having the CCE, which is mapped or linked to the ACK/NACK PUCCH resource, as the specific CCE (e.g., a PDCCH having the first CCE). At this point, according to the second embodiment of the present invention, the UE processor (400a) may control the UE transmitter (100a), so that the UE transmitter (100a) can drop transmission of a PUCCH belonging to the other PUCCH region than the ACK/NACK PUCCH in each slot.

Since the BS processor (400b) is aware of the PUCCH resource, through which the UE is to transmit the ACK/NACK and/or other control information (e.g., CQI, PMI, RI, SR, and so on), the BS processor (400b) may control the BS receiver (300b), so that the BS receiver (300b) can receive the UCI(s) of the UE through the corresponding PUCCH resource. However, the BS receiver (300b) may not be capable of receiving the UCI of the UE using the PUCCH on which the UCI transmission has been dropped by the UE.

According to the above-described first embodiment to sixth embodiment of the present invention, the UE may be capable of transmitting multiple PUCCHs to the BS in one subframe, while minimizing the IMD.

Furthermore, according to the third embodiment to sixth embodiment of the present invention, multiple dynamic ACK/NACK PUCCHs may be easily aligned to one side band, i.e., one PUCCH region, in each slot.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

What is claimed is:

1. A method of transmitting, by a user equipment, uplink control information in a wireless communication system, the method comprising:
receiving downlink data;
determining a first physical uplink control channel (PUCCH) resource for transmission of acknowledgement/negative acknowledgement (ACK/NACK) information for the downlink data and a second PUCCH resource for transmission of uplink control information other than the ACK/NACK information; and
transmitting the ACK/NACK information and the other uplink control information by using the first PUCCH resource and the second PUCCH resource in an uplink subframe, respectively, when the first and second PUCCH resources are located at one side based on a center frequency in each slot of the uplink subframe, and dropping the transmission of the other uplink control information and transmitting the ACK/NACK information by using the first PUCCH resource when the first and second PUCCH resources are located at different sides based on the center frequency in each slot of the uplink subframe, wherein the first PUCCH resource is determined based on a first control channel element index of a physical downlink control channel (PDCCH) carrying control information of the downlink data.

2. A user equipment of transmitting uplink control information in a wireless communication system, the user equipment comprising:

a receiver; and
a transmitter;
a processor operatively connected to the receiver and the transmitter, and configured to control the receiver and the transmitter,
wherein the processor is configured to:
control the receiver to receive downlink data,
determine a first physical uplink control channel (PUCCH) resource for transmission of acknowledgement/negative acknowledgement (ACK/NACK) information for the downlink data and a second PUCCH resource for transmission of uplink control information other than the ACK/NACK information,
control the transmitter to transmit the ACK/NACK information and the other uplink control information by using the first PUCCH resource and the second PUCCH resource in a uplink subframe, respectively, when the first and second PUCCH resources are located at one side based on a center frequency in each slot of the uplink subframe, and
drop the transmission of the other uplink control information and control the transmitter to transmit the ACK/NACK information by using the first PUCCH resource when the first and second PUCCH resources are located at different sides based on the center frequency in each slot of the uplink subframe,
wherein the first PUCCH resource is determined based on a first control channel element index of a physical downlink control channel (PDCCH) carrying control information of the downlink data.

3. A method of receiving, by a base station, uplink control information in a wireless communication system, the method comprising:

transmitting downlink data to a user equipment; and
receiving acknowledgement/negative acknowledgement (ACK/NACK) information for the downlink data and other uplink control information other than the ACK/NACK information by using a first physical uplink control channel (PUCCH) resource and a second PUCCH resource in a uplink subframe, respectively, when the first and second PUCCH resources are located at one side based on a center frequency in each slot of the uplink subframe, and assuming that transmission of other uplink control information using the second PUCCH resource by the user equipment is dropped in the uplink subframe and receiving the ACK/NACK information by using the first PUCCH resource in the uplink subframe when the first and second PUCCH resources are located at different sides based on the center frequency in each slot of the uplink subframe, wherein the first PUCCH resource is determined based on a first control channel element index of a physical downlink control channel (PDCCH) carrying control information of the downlink data.

4. A base station of receiving uplink control information in a wireless communication system, the base station comprising:

a receiver; and
a transmitter;
a processor operatively connected to the receiver and the transmitter, and configured to control the receiver and the transmitter,
wherein the processor is configured to:
control the receiver to receive downlink data,
control the receiver receive acknowledgement/negative acknowledgement (ACK/NACK) information for the downlink data and other uplink control information other than the ACK/NACK information by using a first physical uplink control channel (PUCCH) resource and a second PUCCH resource in a uplink subframe, respectively, when the first and second PUCCH resources are located at one side based on a center frequency in each slot of the uplink subframe, and
assume that transmission of other uplink control information using the second PUCCH resource by the user equipment is dropped in the uplink subframe and control the receiver to receive the ACK/NACK information by using the first PUCCH resource in the uplink subframe when the first and second PUCCH resources are located at different sides based on the center frequency in each slot of the uplink subframe,
wherein the first PUCCH resource is determined based on a first control channel element index of a physical downlink control channel (PDCCH) carrying control information of the downlink data.

* * * * *